(12) United States Patent
Nam et al.

(10) Patent No.: US 8,910,476 B2
(45) Date of Patent: Dec. 16, 2014

(54) EXHAUST GAS CONDENSATE CONTROL METHOD AND EXHAUST GAS RECIRCULATION SYSTEM THEREOF

(75) Inventors: Kihoon Nam, Gunpo-si (KR); Jinsuk Kang, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 529 days.

(21) Appl. No.: 13/252,026

(22) Filed: Oct. 3, 2011

(65) Prior Publication Data

US 2012/0279200 A1 Nov. 8, 2012

(30) Foreign Application Priority Data

May 4, 2011 (KR) .......................... 10-2011-0042359

(51) Int. Cl.
*F02B 33/44* (2006.01)
*F02M 25/07* (2006.01)
*F02P 5/00* (2006.01)
*F02D 41/00* (2006.01)
*F02M 25/022* (2006.01)
*F02B 29/04* (2006.01)
*F02D 41/14* (2006.01)
*F02B 37/00* (2006.01)

(52) U.S. Cl.
CPC ....... *F02M 25/0709* (2013.01); *F02M 25/0227* (2013.01); *F02M 25/0731* (2013.01); *F02M 25/0738* (2013.01); *F02M 25/074* (2013.01); *F02M 25/0755* (2013.01); *F02D 41/0072* (2013.01); *F02B 29/0406* (2013.01); *F02M 25/0707* (2013.01); *F02M 25/0732* (2013.01); *F02D 2041/1472* (2013.01); *F02B 37/00* (2013.01); *F02D 2041/1433* (2013.01); *Y02T 10/47* (2013.01)
USPC ..................... 60/605.2; 701/108; 123/568.22; 123/406.55; 123/677

(58) Field of Classification Search
CPC ................... F02D 41/0072; F02D 2041/1433; F02D 2041/1472; F02M 25/0227; F02M 25/0709; F02M 25/0731; F02M 25/0738; F02M 25/074; F02M 25/0755; F02M 25/0707; F02M 25/0732; F02B 39/0406; F02B 37/00; Y02T 10/47
USPC ........ 60/605.2; 701/108; 123/568.22, 406.55, 123/677
IPC ...................................................... F02M 25/07
See application file for complete search history.

(56) References Cited

U.S. PATENT DOCUMENTS 6,062,204 A * 5/2000 Cullen ..................... 123/568.22
6,681,171 B2 * 1/2004 Rimnac et al. ................. 701/108

(Continued)

FOREIGN PATENT DOCUMENTS

DE 102006015970 A1 * 10/2007 .............. F02D 21/08
JP 09-032653 A 2/1997

(Continued)

*Primary Examiner* — Thai Ba Trieu
(74) *Attorney, Agent, or Firm* — Morgan, Lewis & Bockius LLP

(57) ABSTRACT

An exhaust gas condensate control method includes selecting modeling objects from the exhaust gas recirculation (EGR) system, acquiring control factors from the modeling objects, such as mass, temperature, pressure, absolute humidity, relative humidity, partial water vapor pressure of the exhaust gas and a gas mixture, calculating an estimated relative humidity value, a desired relative humidity value from estimated relative humidity value, and an allowable relative humidity limit and a current relative humidity value of the EGR system, and precluding production of condensate in the EGR system by feedback-controlling the intake air flow rate of a mixing pipe line, the opening amount of an LP-EGR (low pressure) valve, and boost pressure by using an applied control value compensating the desired relative humidity value. An EGR system may be an LP-EGR type or an HP-EGR (high pressure)+LP-EGR type.

18 Claims, 15 Drawing Sheets

(56) References Cited

U.S. PATENT DOCUMENTS

| | | | |
|---|---|---|---|
| 6,725,848 B2* | 4/2004 | Ramamurthy et al. | 123/568.22 |
| 6,742,335 B2* | 6/2004 | Beck et al. | 60/605.2 |
| 6,899,090 B2 | 5/2005 | Arnold | 60/605.2 |
| 6,934,621 B2* | 8/2005 | Bhargava et al. | 701/108 |
| 6,948,475 B1* | 9/2005 | Wong et al. | 123/568.12 |
| 7,079,938 B2* | 7/2006 | Bhargava et al. | 701/108 |
| 7,292,929 B2* | 11/2007 | Durand | 701/108 |
| 7,349,792 B2* | 3/2008 | Durand | 701/108 |
| 7,530,336 B2* | 5/2009 | Brecheisen, II | 60/605.2 |
| 7,597,093 B2* | 10/2009 | Totten et al. | 123/677 |
| 7,715,976 B1* | 5/2010 | Xiao et al. | 701/108 |
| 8,121,774 B2* | 2/2012 | Kesse et al. | 701/108 |
| 8,296,042 B2* | 10/2012 | Xiao et al. | 123/677 |
| 2004/0237508 A1* | 12/2004 | Yamazaki et al. | 60/277 |
| 2007/0277792 A1* | 12/2007 | Durand | 701/108 |
| 2009/0013977 A1* | 1/2009 | Brecheisen, II | 123/563 |
| 2009/0308071 A1 | 12/2009 | Yamashita et al. | 60/605.2 |
| 2010/0199959 A1* | 8/2010 | Brown et al. | 123/568.16 |
| 2011/0160982 A1* | 6/2011 | Kumar et al. | 701/103 |
| 2012/0012088 A1* | 1/2012 | Jung | 123/568.22 |
| 2012/0024271 A1* | 2/2012 | Pasero et al. | 123/568.22 |
| 2012/0090584 A1* | 4/2012 | Jung | 123/568.12 |

FOREIGN PATENT DOCUMENTS

| | | | | |
|---|---|---|---|---|
| JP | 10-68358 A | | 3/1998 | |
| JP | 2002147288 A | * | 5/2002 | F02M 25/07 |
| JP | 2008-196368 A | | 8/2008 | |
| JP | 2009-121300 A | | 6/2009 | |
| JP | 2009-275673 A | | 11/2009 | |
| JP | 2010133287 A | * | 6/2010 | F02M 25/07 |
| JP | 2010-223179 A | | 10/2010 | |
| JP | 4631886 B2 | | 11/2010 | |
| KR | 10-2008-0095843 A | | 10/2008 | |
| KR | 10-2008-0095844 A | | 10/2008 | |
| KR | 2012056345 A | * | 6/2012 | F02M 25/07 |

* cited by examiner

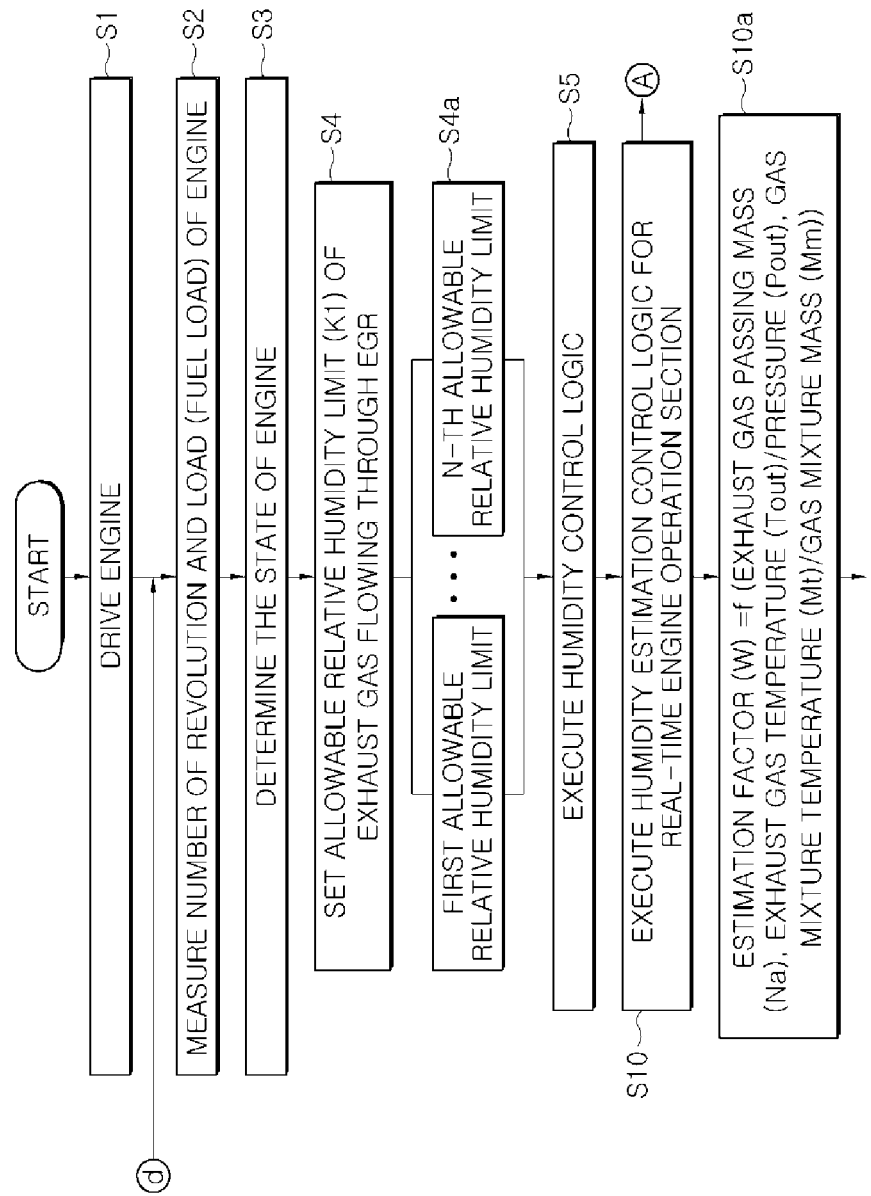

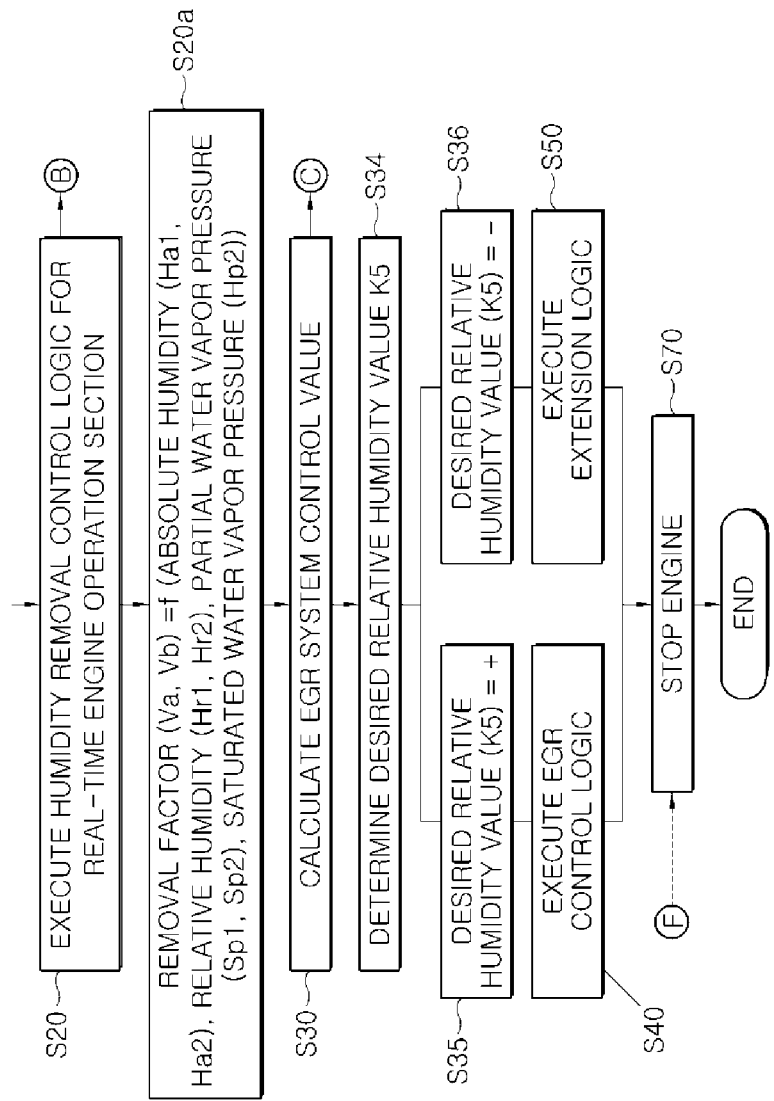

FIG.2

| | | |
|---|---|---|
| [kg/h] | | AIR FLOW RATE |
| [c.degree] | | ATMOSPHERIC TEMPERATURE |
| [kPa] | | ATMOSPHERIC PRESSURE |
| [—] | | INTAKE AIR RELATIVE HUMIDITY |
| [kPa] | | SATURATED WATER VAPOR PRESSURE |
| [kPa] | | PARTIAL WATER VAPOR PRESSURE |
| [—] | | ABSOLUTE HUMIDITY |
| [kg/h] | | WATER VAPOR MASS IN FRESH AIR |
| [kg/h] | | AMOUNT OF FUEL |
| [kg/h] | | WATER VAPOR MASS IN EXHAUST GAS |
| [—] | | LPEGRmass/(Mdota+Mdotf) |
| [c.degree] | | TEMPERATURE AT LP COOLER OUTLET |
| [kPa] | | PRESSURE AT LP COOLER OUTLET |
| [—] | | ABSOLUTE HUMIDITY AT LP COOLER OUTLET |
| [kPa] | | SATURATED WATER VAPOR PRESSURE AT LP COOLER OUTLET |
| [kPa] | | WATER VAPOR PRESSURE AT LP COOLER OUTLET |
| [—] | | RELATIVE HUMIDITY AT LP COOLER OUTLET |
| [c.degree] | | TEMPERATURE AT INTERCOOLER OUTLET |
| [kPa] | | PRESSURE AT INTERCOOLER OUTLET |
| [kg/h] | | AIR AT INTERCOOLER OUTLET+LPEGRmass |
| [kg/h] | | WATER VAPOR MASS AT INTERCOOLER OUTLET |
| [—] | | ABSOLUTE HUMIDITY AT INTERCOOLER OUTLET |
| [kPa] | | SATURATED VAPOR PRESSURE |
| [kPa] | | WATER VAPOR PRESSURE |
| [—] | | RELATIVE HUMIDITY AT INTERCOOLER OUTLET |

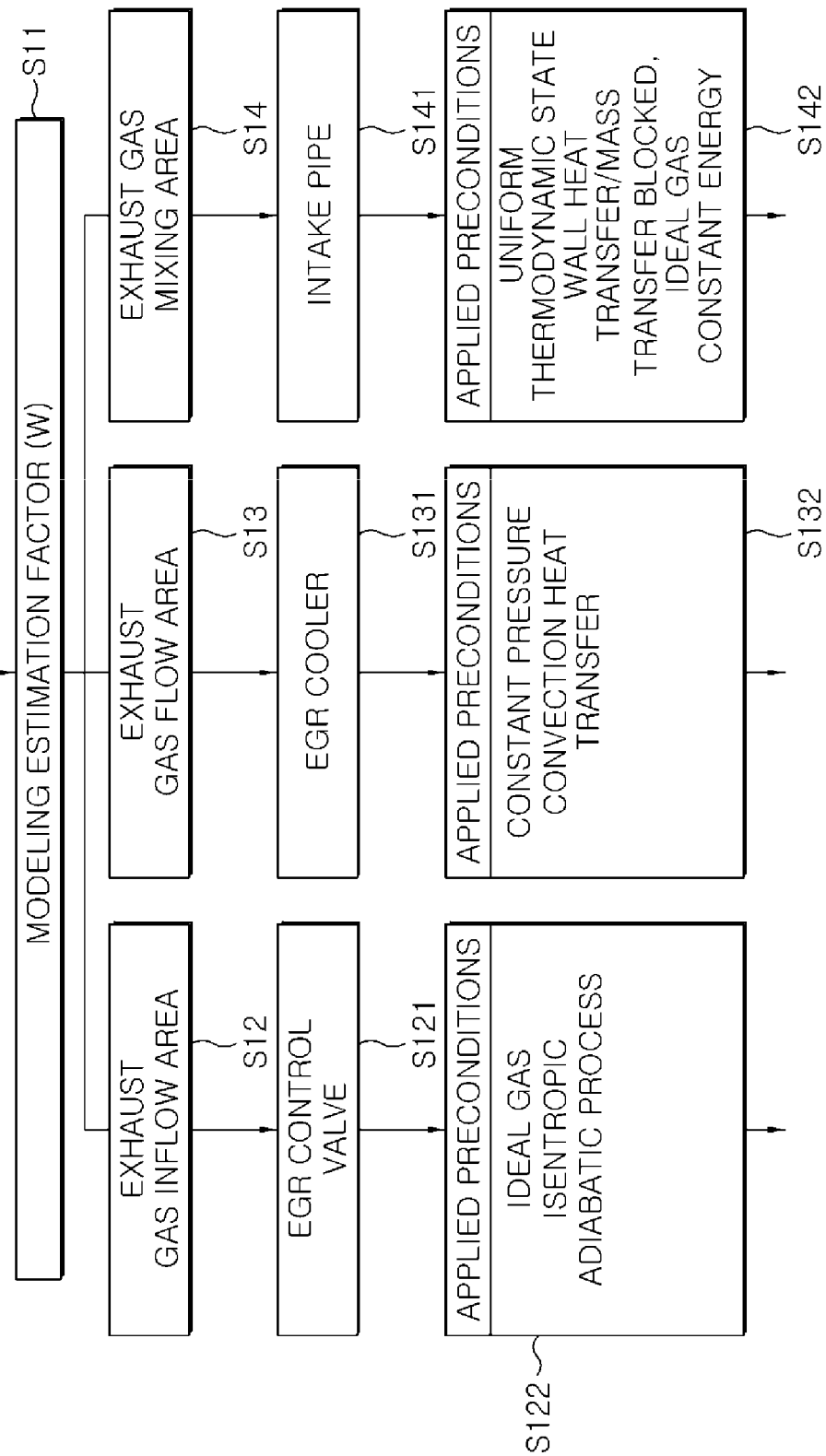

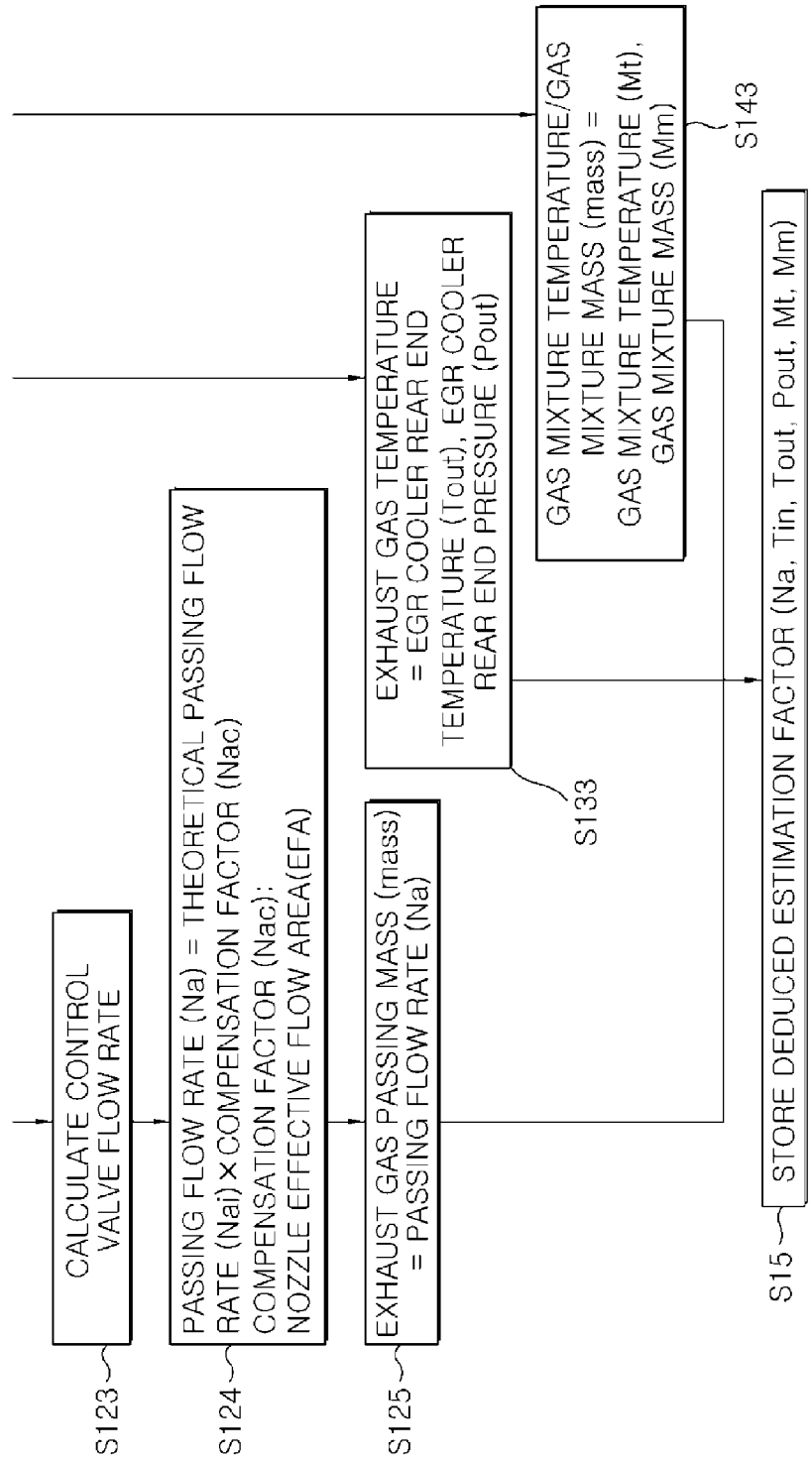

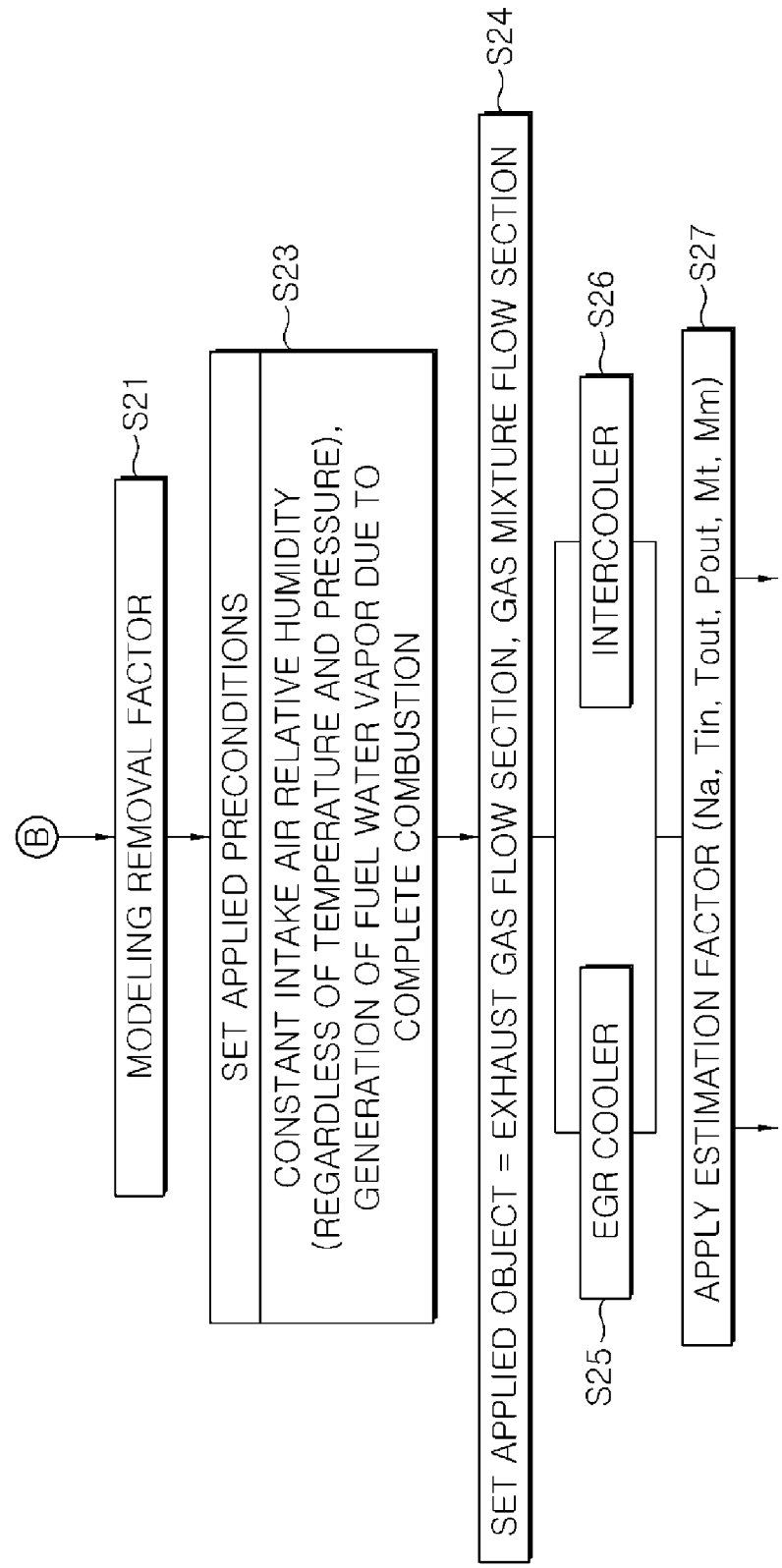

FIG.6
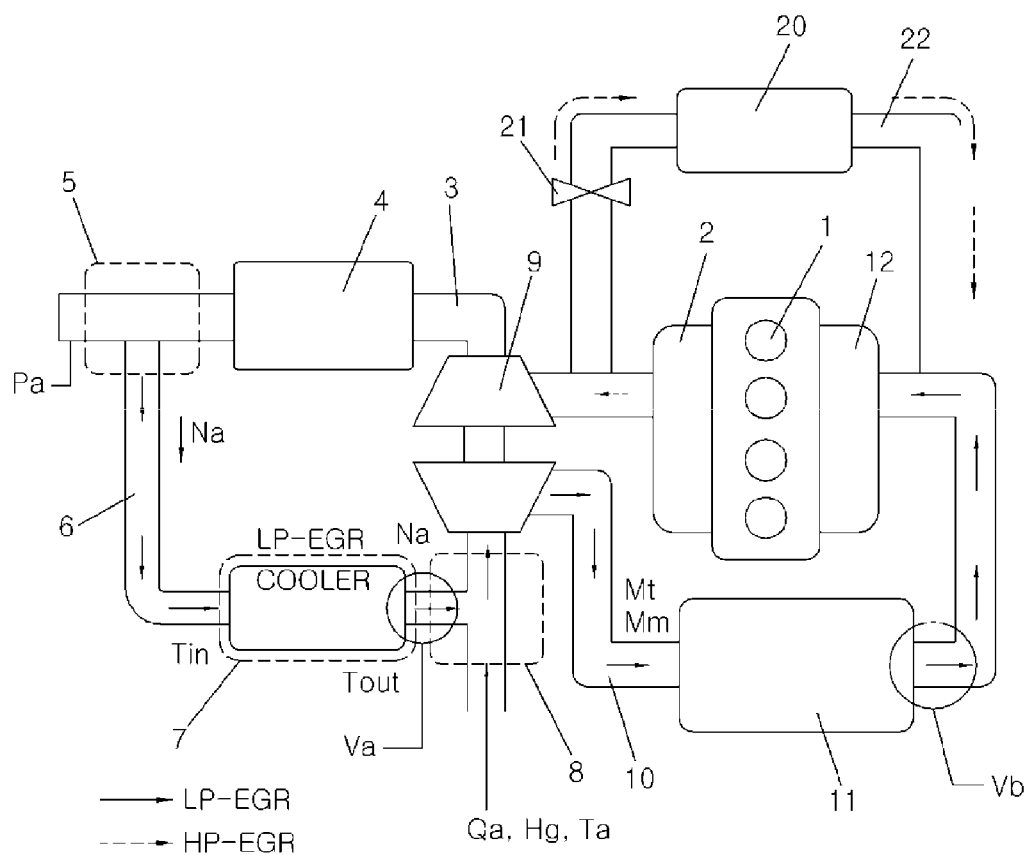
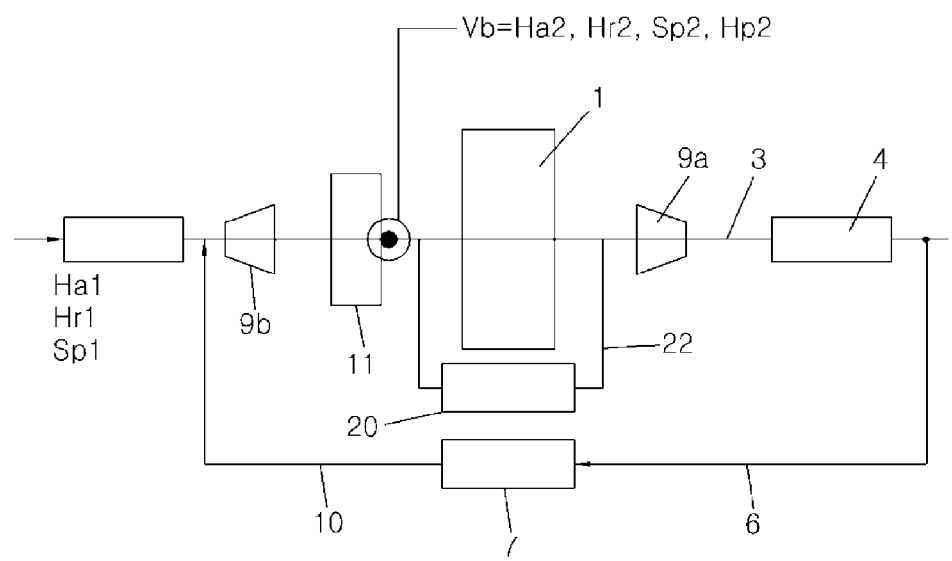

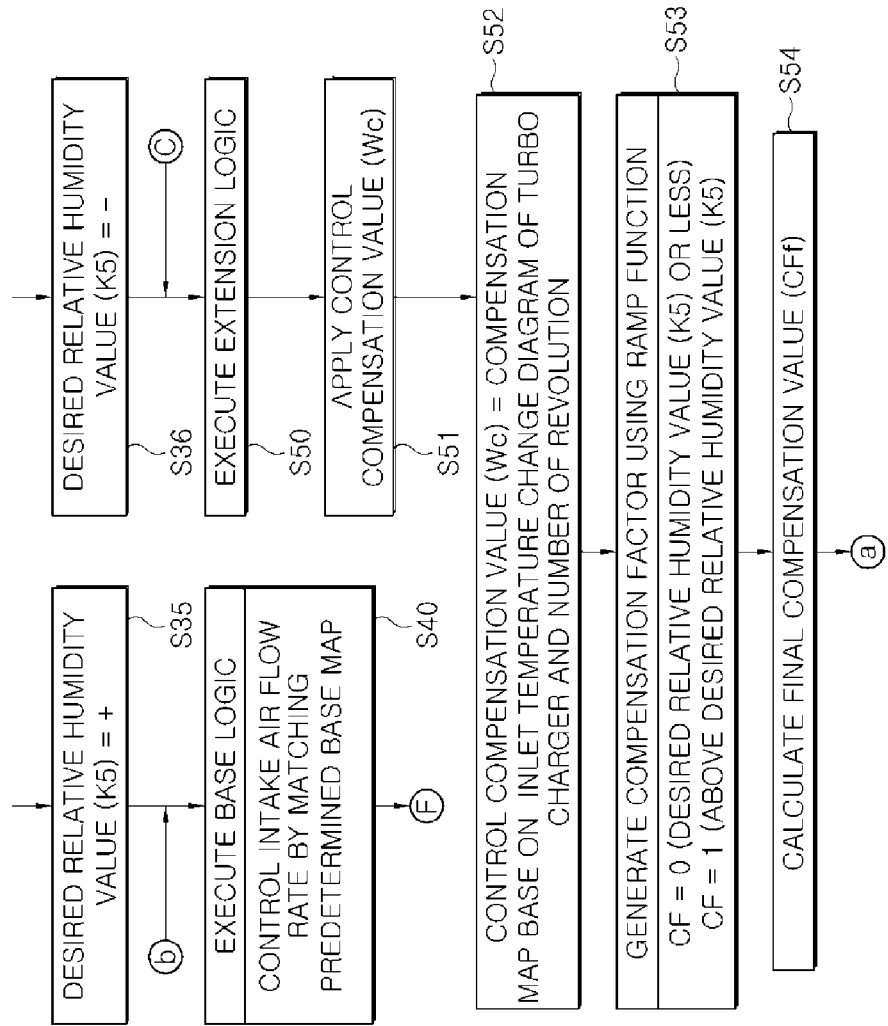

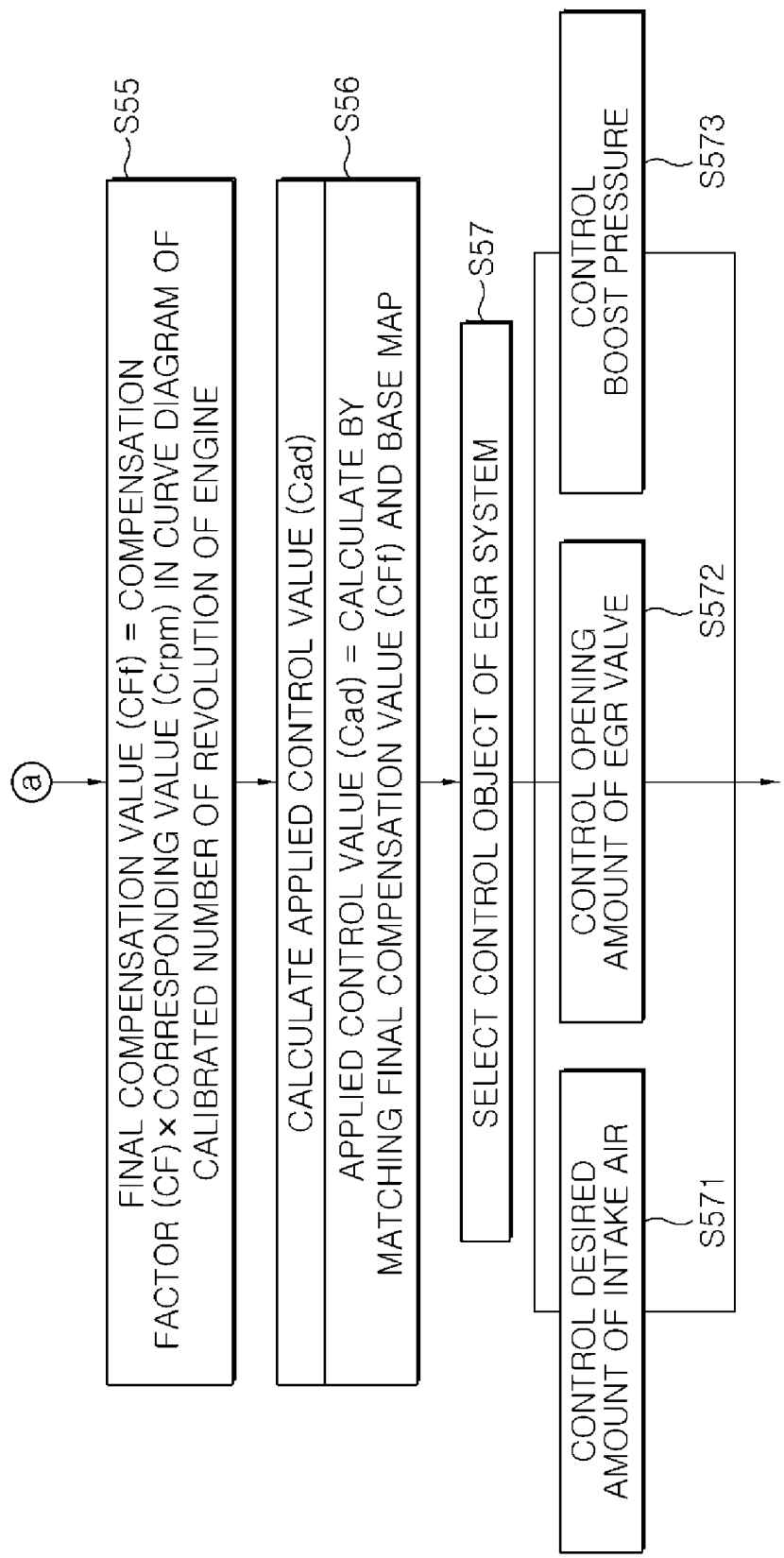

EXHAUST GAS CONDENSATE CONTROL METHOD AND EXHAUST GAS RECIRCULATION SYSTEM THEREOF

CROSS-REFERENCE TO RELATED APPLICATIONS

The present application claims priority of Korean Patent Application Number 10-2011-0042359 filed May 4, 2011, the entire contents of which application is incorporated herein for all purposes by this reference.

BACKGROUND OF INVENTION

1. Field of Invention

The present invention relates to an exhaust gas recirculation (EGR) system that recirculates an exhaust gas to an engine, and more particularly, to an exhaust gas condensate control method that can keep the components of an EGR system safe against the danger of corrosion by preventing possibility of generation of condensate from an exhaust gas flowing through an EGR line, and an exhaust gas recirculation system using the method.

2. Description of Related Art

In general, when an exhaust gas recirculation (EGR) system is used, the intake air supplied to an engine is compressed by operating a turbo charger with an exhaust gas discharged to the outside from the engine while some of the exhaust gas is supplied back to the engine, such that engine performance can be improved.

The EGR system can be classified into an HP (High Pressure)-EGR type that takes out and uses an exhaust gas (or referred to as an EGR gas) before the turbo charger and an LP (Low Pressure)-EGR type that takes out and uses an exhaust gas behind the turbo charger.

In general, the EGR system is applied to vehicles in a combination of the HP-EGR and the LP-EGR.

The HP-EGR is a type that takes out some of the exhaust gas out of an exhaust manifold before the exhaust gas flowing into a turbo charger and directly supplies the exhaust gas to an intake manifold, whereas the LP-EGR is a type that sends some of an exhaust gas, which has passed through a turbo charger and a diesel particulate filter (DPF, a catalytic filter) after out of an exhaust manifold, to the front end of a compressor of the turbo charger and then allows the exhaust gas mixing with an intake air and flowing to an intake manifold.

Therefore, unlike the HP-EGR, the LP-EGR can reduce generation of nitride oxide by using relatively clean exhaust gas with pollutants filtered through the DPF at low pressure/low temperature, and the exhaust gas is supplied to the front end of the compressor of the turbo charger, such that distribution performance of the exhaust gas can be considerably improved.

In particular, when an EGR system implements only the LP-EGR without the HP-EGR, all of the exhaust gas can be used in the turbo charger, such that efficiency of the turbo charger can be significantly increased.

Although the EGR system has various advantages as described above, it is necessarily equipped with an EGR valve, an EGR cooler, a turbo charger, and an intercooler, such that the configuration of an engine room becomes necessarily complicated.

These necessary components, particularly the turbo charger for compressing an intake air and the intercooler for decreasing temperature of excessive gas mixture, necessarily cause phase change of the exhaust gas and the phase change of the exhaust gas necessarily leads to condensation.

The condensate produced in the EGR system accumulates in the turbo charger and the intercooler, which may be corroded, such that corrosion is necessarily accelerated particularly at the compressor of the turbo charger and the outlet of the intercooler.

The acceleration of corrosion in the turbo charger and the intercooler is, unlike the HP-EGR, more deteriorative for the LP-EGR type of EGR system necessarily equipped with the turbo charger and the intercooler, which may be a factor that largely decreases actual applicability of the LP-EGR type of EGR system to vehicles.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention have been made in an effort to provide an exhaust gas condensate control method that can preclude possibility of generation of condensate due to the water contained in an exhaust gas, by calculating relative humidity of an exhaust gas discharged out of an engine and flowing with an external air through an exhaust gas recirculation (EGR) system, in accordance with the operational state of the engine and the EGR system, and by feedback-controlling the components of the EGR system by using the calculated relative humidity value as a control variable, and an exhaust gas recirculation system using the method.

Various aspects of the present invention are directed to provide an exhaust gas condensate control method, including a step of setting a condition that sets an allowable relative humidity limit K1 of an exhaust gas flowing in an EGR (Exhaust Gas Recirculation) system after being discharged from an engine, and detects a current relative humidity value K3 from an operational state of the engine and the EGR system, a step of calculating humidity factors that distributes the exhaust gas in the EGR system, selects modeling objects for calculations of an estimation factor W and removal factors Va and Vb, calculates the estimation factor W and the removal factors Va and Vb, and calculates an estimated relative humidity value K2 of the exhaust gas flowing in the EGR system, a step of executing humidity removal that determines a desired relative humidity value K5 for the EGR system as desired relative humidity value K5=+ or − from relationships of the allowable relative humidity limit K1, the current relative humidity value K3, and the estimated relative humidity value K2, and executes an EGR control logic that controls the EGR system with an intake flow rate control for the desired relative humidity value K5=+, or executes an extension logic of a feedback control for the desired relative humidity value K5=−, and a step of control standby mode that performs initialization to return to the step of setting a condition when the engine stops.

Conditions of ideal gas and isentropic adiabatic reversible process are applied to the inflow section, conditions of constant pressure, convection heat transfer, and generation of fuel water vapor due to complete combustion are applied to the flow section, conditions of uniform thermodynamic state, prevention of wall heat transfer/mass transfer, ideal gas, and constant energy are applied to the mixing section, conditions of constant relative humidity of intake air flowing inside from the outside (regardless of temperature and pressure) and generation of fuel water vapor due to complete combustion are applied to the continuous flow section, and the estimation factor and the removal factors are deduced, with the conditions applied.

The estimation factor is a function of exhaust gas passing mass Na diverting and flowing to the EGR line, temperature and pressure Tout and Pout of the exhaust gas flowing through the EGR line, and gas mixture temperature Mt and gas mixture mass mm of a gas mixture composed of the exhaust gas passing mass Na and an intake air flowing inside from the outside and flowing into the intake manifold, and the removal factors are functions of absolute humidity Ha1, relative humidity Hr1, and partial water vapor pressure Sp1 of the exhaust gas from the exhaust gas flowing through the EGR line, and are absolute humidity Ha2, relative humidity Hr2 of the gas mixture composed of the intake air flowing inside from the outside and the exhaust gas, partial water vapor pressure Sp2, and saturated water vapor pressure Hp2.

The exhaust gas passing mass Na is a value acquired by multiplying theoretical passing flow rate Nai by a compensation factor Nac where a nozzle Effective Flow Area (EFA) in the entire flow area of the nozzle considering inlet pressure Pf and outlet pressure Pa is applied.

The desired relative humidity value K5 is calculated by subtracting a relative humidity control value K4 from the allowable relative humidity limit K1, where the relative humidity control value K4 is a value acquired by subtracting the current relative humidity value K3 from the estimated relative humidity value K2, and the desired relative humidity value is assigned as K5=+ or − to indicate the possibility of condensation The exhaust gas condensate control method further includes a step in the extension logic that calculates a control compensation value Wc by applying a compensation map based on an inlet temperature change diagram and a number of revolution of a turbo charger, where the compensation map is constructed on the basis of data acquired from tests according to specifications of the engine and the turbo charger, determines a compensation factor CF between 0 and 1 on the basis of the calculated control compensation value Wc, calculates a final compensation value CFf by multiplying the compensation factor CF by a corresponding value Crpm calibrated on a curve diagram according to a number of revolution of the engine, and calculates an applied control value Cad by using a match relationship with the base map, and substitutes the control value Cad for the desired relative humidity value K5 as a control variable to optimize the control objects.

Compensation factor CF is determined by using a Ramp function, the compensation factor CF=0 is for the desired relative humidity value K5 or less, and the compensation factor CF=1 is for above the desired relative humidity value K5.

The control objects in the modeling object of the extension logic are a component that distributes the exhaust gas from the exhaust line, a component that sucks the intake air from outside to be mixed with the exhaust gas into the gas mixture, and a component that generates a boost pressure, and the components are controlled by an individual control method such that each of the components is controlled individually, or by a cooperation control method such that the components are controlled cooperatively by one control unit.

Other various aspects of the present invention are directed to provide an exhaust gas recirculation system, including an LP-EGR line that is connected with a turbine of a turbo charger, diverges from an exhaust line connected to an exhaust manifold of an engine, and allows an exhaust gas to flow, a mixing pipe line that is connected with the LP-EGR line at an front end of the turbo charger, mixes an intake air drawn inside from outside with the exhaust gas flowing out of the LP-EGR line to form a gas mixture, and sends the gas mixture to the turbo charger, an intake pipe line connected the mixing pipe line to an intake manifold of the engine, and an ECU (electronic control unit) performing a humidity control logic that includes an EGR control logic that controls an LP-EGR valve and an LP-EGR cooler in the LP-EGR line and an intercooler in the intake pipe line using an intake air flow rate control by matching a base map, and an extension logic that controls the LP-EGR valve and the LP-EGR cooler in the LP-EGR line and the intercooler in the intake pipe line to remove condensate in the EGR system.

An allowable relative humidity limit K1 required for the extension logic is calculated from the gas mixture composed of the exhaust gas flowing in the EGR system and the intake air sucked from outside, an estimated relative humidity value K2 is calculated from calculated or measured factors, including exhaust gas passing mass Na of the LP-EGR valve, temperature Tout, pressure Pout, absolute humidity Ha1, relative humidity Hr1, and partial water vapor pressure Sp1 of the LP-EGR cooler, temperature Mt and mass Mm of the gas mixture in the mixing pipe line, and absolute humidity Ha2, relative humidity Hr2, partial water vapor pressure Sp2, and saturated water vapor pressure Hp2 of the intercooler, a current relative humidity value K3 is calculated from the exhaust gas flowing into the EGR line from the LP-EGR valve and passing through the LP-EGR cooler, and the control objects of the extension logic executed in the humidity control logic are the mixing pipe line in which an amount of the intake air to be drawn is controlled, the LP-EGR valve in which an flow rate of the exhaust gas distributed to the LP-EGR line is controlled by controlling an opening amount of the valve, and a boost pressure that is changed by operations of the engine and the EGR system.

The control objects are controlled by an individual control method such that each of the components are controlled individually, or by a cooperation control method such that the components are controlled cooperatively by one control unit.

The ECU may further include an ETK ECU (embedded toolkit electronic control unit) performing the humidity control logic, and the ETK ECU is connected to an ETK interface cable to control the opening amount of the LP-EGR valve, the intake air flow rate in the mixing pipe line, and the boost pressure.

The exhaust gas recirculation system may further include an emergency filter disposed in the LP-EGR line between the LP-EGR valve and the LP-EGR cooler, and a pressure sensor disposed in the LP-EGR valve and detecting a pressure of the exhaust gas and a humidity sensor disposed in the mixing pipe line and detecting a humidity of the exhaust gas and the intake air.

The exhaust gas recirculation system may further include an HP (high pressure)-EGR line diverging from the exhaust manifold and connected to the intake manifold, and an HP-EGR valve and an HP-EGR cooler disposed on the HP-EGR line to allow the exhaust gas to flow from the exhaust manifold to the intake manifold.

According to various features of the present invention, it is possible to allow the components to be free from the danger of corrosion by basically removing humidity of an exhaust gas that is a cause for producing condensate in an EGR (Exhaust Gas Recirculation) system, which is an exhaust gas recirculation system, and particularly, it is possible to considerably improve actual applicability to vehicles of an LP-EGR type of EGR system by ensuring safety of a turbo charger and an intercooler that are more vulnerable to the possibility of corrosion due to condensate.

Further, according to other various features of the present invention, it is possible to perform estimation control for the future circumstances by monitoring in real time whether condensate is produced from an exhaust gas, in accordance with the operational states of an engine and the EGR system.

In addition, according to yet other features of the present invention, it is possible to reduce cost, as compared with when a humidity sensor is used, because whether condensate is produced from an exhaust gas is determined without a humidity sensor and condensate is prevented from being produced.

Moreover, according to still other features of the present invention, since an exhaust gas humidity control logic is executed by using an ETK ECU that implements additional functions by interrupting the logics in an ECU for controlling an engine, it is possible to considerably improve usability and generality of the ECU, in addition to minimizing the cost for developing the ECU logics.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 1A and FIG. 1B are flowcharts illustrating an exemplary exhaust gas condensate control method for precluding generation of condensate from an exhaust gas flowing through an Exhaust Gas Recirculation (EGR) system according to the present invention.

FIG. 2 is a table showing units and definitions of exemplary control factors according to the present invention.

FIGS. 3A and 3B are flowcharts for deducing the estimation factor according to exemplary exhaust gas condensate control methods of the present invention.

FIGS. 5A and 5B are flowcharts for deducing removal factors according to exemplary exhaust gas condensate control methods of the present invention.

FIG. 6 is a view showing an exemplary configuration of an LP-EGR+HP-EGR type of EGR system for applying exemplary methods illustrated in FIG. 5.

FIGS. 7A, 7B, 8A and 8B are control flowcharts for precluding generation of condensate in an EGR system by using an exemplary extension logic of the present invention.

Figure 4:
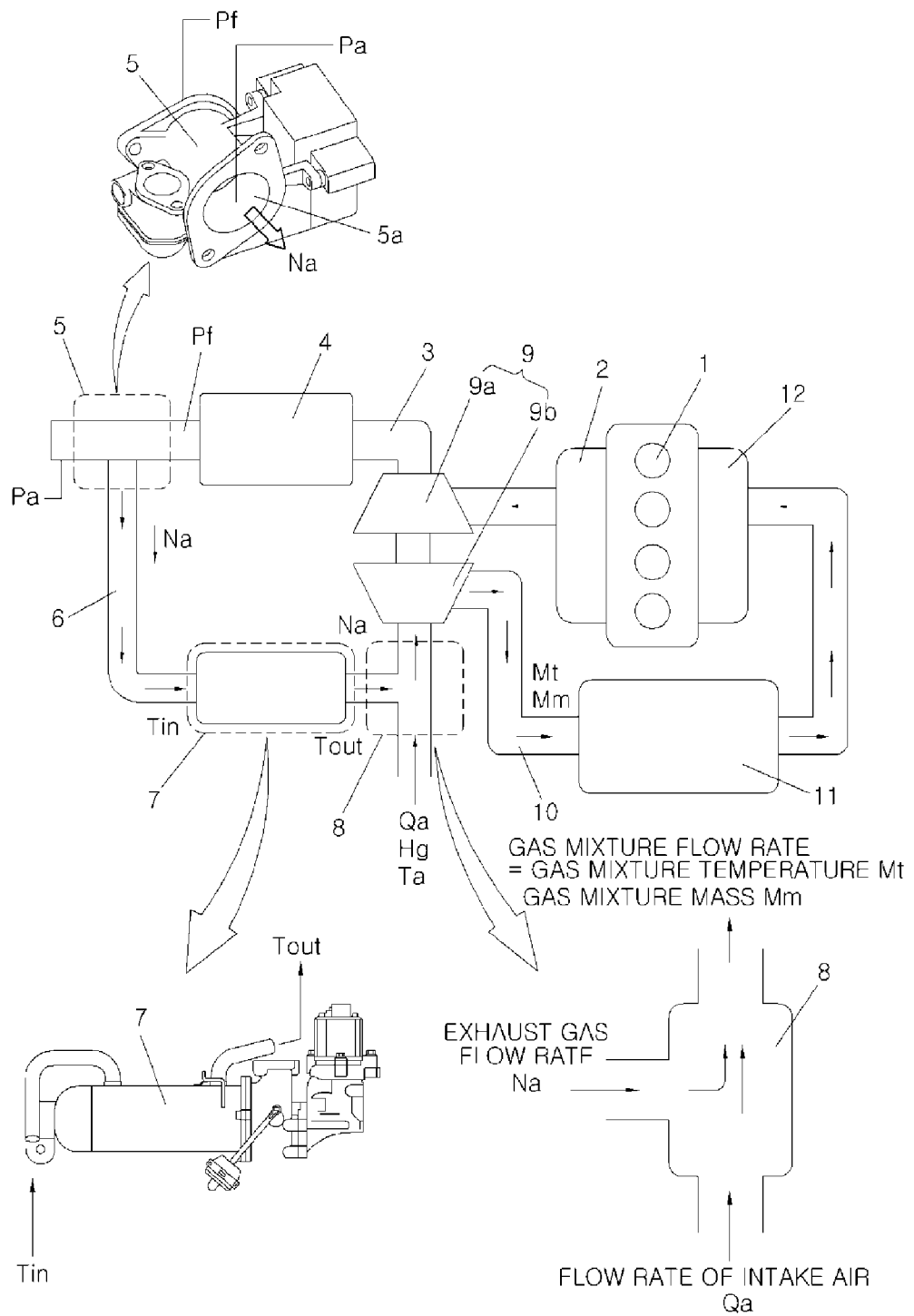
FIG. 4 is a view showing an exemplary configuration of an LP-EGR type of EGR system for applying the exemplary methods illustrated in FIG. 3.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 1, including FIGS. 1(A) and 1(B), is a flowchart illustrating an exemplary method of controlling condensate of an exhaust gas flowing through an Exhaust Gas Recirculation (EGR) system according to the present invention.

As shown in FIG. 1, the revolutions per minute (RPM) and load of an engine are sequentially measured through a step S2 when the engine is on (step S1), and the present state of the engine that is in operation is checked on the basis of the measured factors (step S3).

The load of the engine denotes the amount of fuel supplied to the engine in exemplary embodiments.

When the present state of the engine that is in operation is detected, the degree of water content in an exhaust gas flowing to an EGR line of an EGR system that is in operation is measured, as in step S4, and an allowable relative humidity limit K1 that is allowable without producing condensate is set on the basis of the measured degree of water content.

Allowable relative humidity limit K1 is acquired from a gas mixture of the exhaust gas flowing in the EGR system after being discharged from the engine and an intake air sucked from the outside.

Step 4a shows that allowable relative humidity limit K1 is subdivided into several values and the degree of subdivision may be appropriately selected, depending on the specifications of the engine and the EGR system.

Allowable relative humidity limit K1 set as described above is stored in a logic map and a specific controller or an electronic control unit (ECU) for controlling the engine can be used for the logic map. An ECU is used to store the values in exemplary embodiments.

After allowable relative humidity limit K1 for the exhaust gas is calculated, with the engine and the EGR system in operation, as in step S5, a humidity control logic is executed in the following steps, such that condensate due to the exhaust gas flowing through the EGR line is precluded from being produced.

A precondition for executing the humidity control logic assumes that the relative humidity of the exhaust gas is 100% or more. The relative humidity is measured or calculated at the rear end of an intercooler, which is a component of the EGR system, through which the gas mixture (exhaust gas+ intake air) passes.

The humidity control logic has generality to be used for all of an HP-EGR type of EGR system, an LP-EGR type of EGR system, or an HP-EGR+LP-EGR type of EGR system.

The humidity control logic is composed of a logic for estimating humidity, a logic for removing humidity, a control value calculation logic for controlling the EGR system, and an execution logic for preventing condensate from being produced from the exhaust gas.

Step S10 is a humidity estimation logic, which deduces an estimation factor W for estimating the relative humidity of the exhaust gas, as in step S10a, by executing the humidity estimation logic.

Estimation factor W is calculated by modeling the components of the EGR system.

Referring to FIGS. 3 and 4, various components can be selected for the modeling of estimation factor W. In exemplary embodiments, components are selected so that from selected components, exhaust gas passing mass Na which flows through the EGR line of the EGR system, temperature Tout and pressure Pout of the exhaust gas flowing through the EGR line, and temperature Mt and mass Mm of a gas mixture composed of intake air flowing inside from the outside and exhaust gas and supplied to an intake manifold can be acquired. Na, Tout, Pout, Mt, and Mm are stored in the logic map after estimation factor W being deduced.

Referring to FIG. 1(B), step S20 is a humidity removal logic for removing humidity of the exhaust gas, which is executed after estimation factor W is deduced, in which removal factors Va and Vb are newly deduced from estimation factor W, as in step S20a, by executing the humidity removal logic.

Removal factors Va and Vb are calculated by modeling the components of the EGR system.

Referring to FIGS. 1(B) and 6, various components can be selected for the modeling of removal factors Va and Vb. In exemplary embodiments, components are selected so that from selected components, absolute humidity Ha1, relative humidity Hr1, partial water vapor pressure Sp1 of the exhaust gas flowing through the EGR line of the EGR system, and absolute humidity Ha2, relative humidity Hr2, partial water vapor pressure Sp2 and saturated water vapor pressure Hp2 of the gas mixture flowing to the intake manifold through the EGR line can be acquired. Ha1, Hr1, Sp1, Ha2, Hr2, Sp2, and Hp2 are stored in the logic map after removal factors Va and Vb being deduced.

An estimated relative humidity value K2 of the exhaust gas flowing in the EGR system is calculated from estimation factor W and removal factors Va and Vb.

In exemplary embodiments, the process of calculating the estimation factor is defined as the humidity estimation step, the process of calculating the estimated relative humidity value K2 of the exhaust gas flowing in the EGR system by using the removal factors is defined as the humidity removal step, and the humidity estimation step and the humidity removal step are referred to as a humidity factor calculation step.

Step S30 is a control value calculation logic for calculating a control value for controlling the EGR system by using estimation factor W and removal factors Va and Vb, in which the control value used for controlling the components of the EGR system can be calculated by executing the control value calculation logic.

Step S34 determines a desired relative humidity value K5, in which desired relative humidity value K5 is calculated by using the calculated allowable relative humidity limit K1 and estimated relative humidity value K2.

Step S35 shows desired relative humidity value K5=+ and step S36 shows desired relative humidity value K5=−, sign + or − is given to desired relative humidity value K5 to indicate the possibility of condensation. Therefore, different execution logics are applied by dividing desired relative humidity value K5 into two types in exemplary embodiments.

The execution logics include an EGR control logic of step S40 and an extension logic of step S50. The EGR control logic that is executed in step S40 is for intake flow rate control that is implemented by matching a base map that is set in advance in the ECU, while the extension logic that is executed in step S50 is for EGR system control in a type specified by the humidity control logic of an exhaust gas in the exemplar embodiment.

That is, the EGR control logic is a base logic that is necessarily implemented to operate the EGR system, whereas the extension logic is an advanced logic that optimizes the EGR system by selecting some of the components of the EGR system as control objects and feedback-controlling them out of desired relative humidity value K5=−.

The process of executing the EGR control logic and the extension logic is referred to as a humidity removal execution step, in exemplary embodiments.

Step S70 shows when the engine stops, in which as the engine stops, all the control logic according to exemplary embodiments are initialized and switched into a standby state until the engine is restarted.

The process of initialization is referred to as a control standby mode step in exemplary embodiments.

As described above, in exemplary embodiments, since the extension logic is further implemented, in addition to the EGR control logic, it is possible to preclude condensate from being produced from the exhaust gas flowing through the EGR line and particularly, it is possible to ensure safety against the danger of corrosion of the turbo charger and the intercooler of the EGR system.

Although the EGR control logic and the extension logic can be implemented by a specific controller or an ECU for engine control, the extension logic is implemented by an embedded toolkit electronic control unit (ETK ECU) that implements additional functions of the ECU in exemplary embodiments, thus minimizing a specific cost for developing the ECU.

The ETK ECU is a control logic that is executed in a program called an ASCET by interrupting some of the logics in the ECU, which is a general term of a function that controls the engine under conditions out of the main control area of the ECU.

FIG. 2 is a table defining the names and units for control factors according to exemplary embodiments.

As shown in FIG. 2, it can be seen that all the control factors used in exemplary embodiments relate to driving the engine and starting all types of EGR systems and have units and definitions following physical/chemical laws, while control values not stated in exemplary embodiments are calculated from measured values acquired from sensors necessarily disposed in the EGR systems and the engine etc.

FIG. 3, including FIGS. 3(A) and 3(B), is a flowchart illustrating deduction of estimation factor W for estimating the humidity of an exhaust gas according to exemplary embodiments.

A modeling object that is applied to the EGR system to calculate estimation factor W as in step S11 is applied to a section where exhaust gas passing mass Na, temperature Tout and pressure Pout of an exhaust gas, and temperature Mt and mass Mm of a gas mixture can be easily calculated or measured.

Therefore, the modeling object is applied from when the exhaust gas starts to flow into the EGR line diverging from an exhaust line to when the exhaust gas is mixed and flows with an intake air supplied from the outside.

Step S12, step S13, and step S14 show the modeling object. Step S12 shows an exhaust gas inflow area where the exhaust gas flows into the EGR line, step S13 shows an exhaust gas flow area where the exhaust gas that has flowed inside in step S13 keeps flowing, and step S14 shows an exhaust gas mixing area where the exhaust gas is mixed and flows with the intake air drawn inside from the outside.

FIG. 4 shows the configuration of an LP-EGR type of EGR system for specifying a modeling object according to exemplary embodiments.

As shown in FIG. 4, according to the LP-EGR type of EGR system, an exhaust line 3, which is connected with a turbine of a turbo charger 9 and has a diesel particulate filter (DPF) or other suitable filter 4, is connected to an exhaust manifold 2 of an engine 1, an LP-EGR line 6 diverging from the rear end of filter 4 is connected to a mixing pipe line 8 that sucks an external air at the front end of turbo charger 9, and an intake pipe line 10 that is connected to mixing pipe line 8 and has an intercooler 11 is connected to intake manifold 12 of engine 1.

An LP-EGR valve 5 and an LP-EGR cooler 7 are sequentially disposed in LP-EGR line 6.

The exhaust gas inflow area in the LP-EGR type of EGR system corresponds to an EGR control valve (LP-EGR valve 5) stated in step S121, the exhaust gas flow area corresponds to an EGR cooler (LP-EGR cooler 7) stated in step S131, and the exhaust gas mixing area corresponds to mixing pipe line 8 where LP-EGR line 6 and intake pipe line 10, which are stated in step S141, are connected.

Preconditions for calculating estimation factor W are set differently for the EGR control valve (LP-EGR valve 5), the EGR cooler (LP-EGR cooler 7), and mixing pipe line 8, which are the modeling objects selected as described above, and the preconditions are set to make physical and chemical analysis easier, without reducing reliability of data.

In exemplary embodiments, preconditions such as an ideal gas, an isentropic and adiabatic reversible process are set for the EGR control valve (LP-EGR valve 5) as in step S122, preconditions such as constant pressure and convective heat transfer are set for the EGR cooler (LP-EGR cooler 7) as in step S132, and preconditions such as uniform thermodynamic state, blocking of heat transfer through a wall/mass transfer, ideal gas, and constant energy are set for mixing pipe line 8 as in step S142.

In particular, the preconditions for mixing pipe line 8 assume that the sum of mass change ratios of the exhaust gas and the intake air is the same as the mass change ratio of the flow supplied to a compressor of the turbo charger, such that flow rate Qa of the intake air, relative humidity Hq, and atmospheric temperature Ta, as well as the temperature Mt and mass Mm of the gas mixture acquired from mixing pipe line 8, can be more easily calculated or measured.

With the preconditions applied, exhaust gas passing flow rate Na at the EGR control valve (LP-EGR valve 5) which is supplied to LP-EGR line 6 is calculated by step S123 to step S125, in which exhaust gas passing flow rate Na is calculated from LP-EGR valve 5, as in FIG. 4, such that a compensating value considering a nozzle 5a of LP-EGR valve 5 is applied.

Therefore, as in step S124, exhaust gas passing flow rate Na=theoretical passing flow rate Nai×compensating factor Nac, where compensating factor Nac is calculated by applying an Effective Flow Area (EFA) of a nozzle in the entire flow area of nozzle 5a in consideration of inlet pressure Pf and outlet pressure Pa of LP-EGR valve 5.

Exhaust gas passing flow rate Na is defined as the exhaust gas passing mass, as in step S125.

With the preconditions applied, rear end temperature Tout and rear end pressure Pout of LP-EGR cooler 7 where exhaust gas passing flow rate Na goes out are calculated, as in step S133, in the EGR cooler (LP-EGR cooler 7).

Rear end temperature Tout and rear end pressure Pout increase reliability of data by referring to front end temperature Tin and front end pressure Pin of LP-EGR cooler 7.

With the preconditions applied, gas mixture temperature Mt and gas mixture mass Mm when the gas mixture (exhaust gas+intake air from the outside) produced in mixing pipe line 8, as in step S143, and flows out of mixing pipe line 8, are calculated.

Mixing pipe line 8, as shown in FIG. 4, mixes exhaust gas passing flow rate Na, which flows through LP-EGR line 6 and flows out of LP-EGR cooler 7, with intake air flow rate Qa supplied from the outside. The gas mixture is then sent out to a compressor 9b of turbo charger 9 and through intake pipe line 10.

In exemplary embodiments, the reliability of data is increased by calculating gas mixture temperature Mt and gas mixture mass Mm with reference to the measured values of intake air flow rate Qa, relative humidity Hq, and atmospheric temperature Ta.

Na, Tin, Tout, Pout, Mt, and Mm that are calculated or measured as described above are all used for calculating estimation factor W and stored in the logic map, as in step S15, and are also used as variables for calculating estimated relative humidity value K2.

Figure 5B:
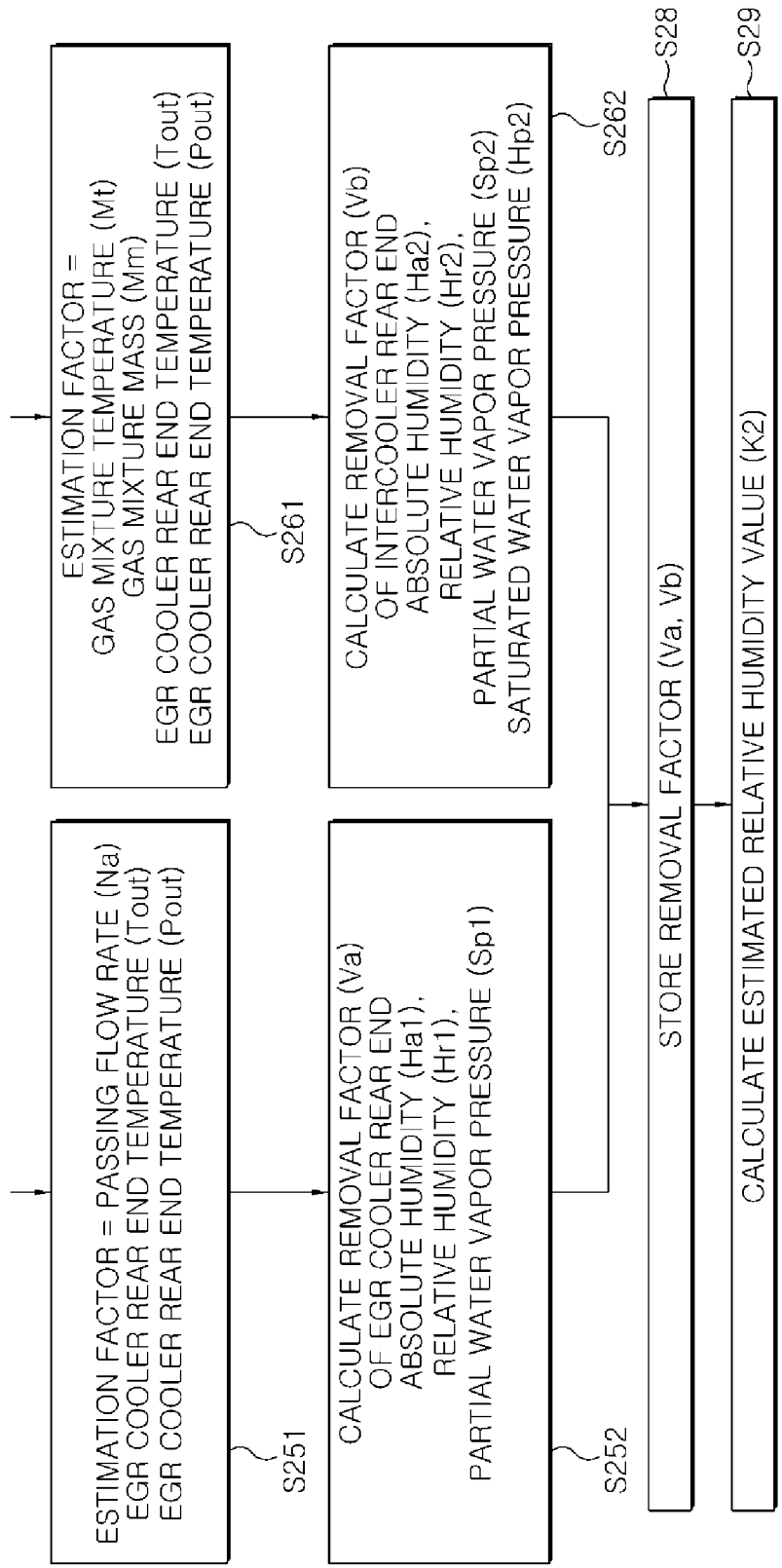

FIG. 5, including FIGS. 5(A) and 5(B), is a flowchart illustrating deduction of a removal factor for removing humidity of an exhaust gas according to exemplary embodiments.

The modeling object that is applied to the EGR system to calculate removal factors Va and Vb, as in step S21, is a section where temperature changes in the EGR line, and the state values for the exhaust gas and the gas mixture which are calculated in the section are also calculated by using estimation factor W that has been calculated.

The preconditions applied to the modeling object selected as described above are constant relative humidity of the intake air from the outside (regardless of temperature and pressure) and generation of fuel water vapor due to complete combustion, as in step S23, and the preconditions are set to make physical and chemical analysis easier without reducing the reliability of data.

FIG. 6 is a view showing the configuration of an HP-EGR+LP-EGR type of EGR system, which has a modeling object for calculating the removal factors of FIG. 5, and as shown in FIG. 6, the EGR system is implemented by adding an HP-EGR to the LP-EGR type.

This shows expandability that the condensate control method implemented by exemplary embodiments is not limited to an LP-EGR type of EGR system but can be also applied to an HP-EGR type of EGR system.

In the HP-EGR, an HP-EGR line 22 diverges from an exhaust manifold 2 of an engine 1 and is connected to an intake manifold 12 of engine 1 while an HP-EGR valve 21 and an HP-EGR cooler 20 are disposed in HP-EGR line 22 diverging from exhaust manifold 2.

A modeling object applied to the LP-EGR+HP-EGR type of EGR system is an exhaust gas flow section in EGR line 6 and a gas mixture flow section in intake pipe line 10, as in step S24. Referring to FIG. 6, EGR cooler 7 is selected for the exhaust gas flow section, as in step S25, and intercooler 11 is selected for gas mixture flow section, as in step S26.

Step S27 shows estimation factor W that has been calculated and is used for the calculation of removal factor Va calculated from EGR cooler 7 and removal factor Vb calculated from intercooler 11.

Step S251 shows exhaust gas passing flow rate Na, LP-EGR cooler rear end temperature Tout and rear end pressure Pout that are used in estimation factor W for removal factor Va calculated from EGR cooler 7, while step S261 shows gas mixture temperature Mt, gas mixture mass Mm, LP-EGR cooler rear end temperature Tout and rear end pressure Pout that are used in estimation factor W for removal factor Vb calculated from intercooler 11.

Step S252 shows that removal factor Va calculated in step S251 is a function of absolute humidity Ha1, relative humidity Hr1, and partial water vapor pressure Sp1 at the rear end of LP-EGR cooler 7 and step S262 shows that removal factor Vb calculated by step S261 is a function of absolute humidity Ha2, relative humidity Hr2, partial water vapor pressure Sp2, and saturated water vapor pressure Hp2 at the rear end of intercooler 11.

Ha1, Ha2, Hr1, Hr2, Sp1, Sp2, and Hp2, which are used for calculating removal factors Va and Vb as described above, are all stored in the logic map, as in step S28, and are also used as variables for calculating estimated relative humidity value K2, as in step S29.

Therefore, in exemplary embodiments, estimated relative humidity value K2, which is a control value for preventing condensate from being produced, can be theoretically calculated from Na, Tin, Tout, Pout, Mt, and Mm, which are used for calculating estimation factor W, and Ha1, Ha2, Hr1, Hr2, Sp1, Sp2, and Hp2, which are used for calculating removal factors Va and Vb.

Figure 7A:
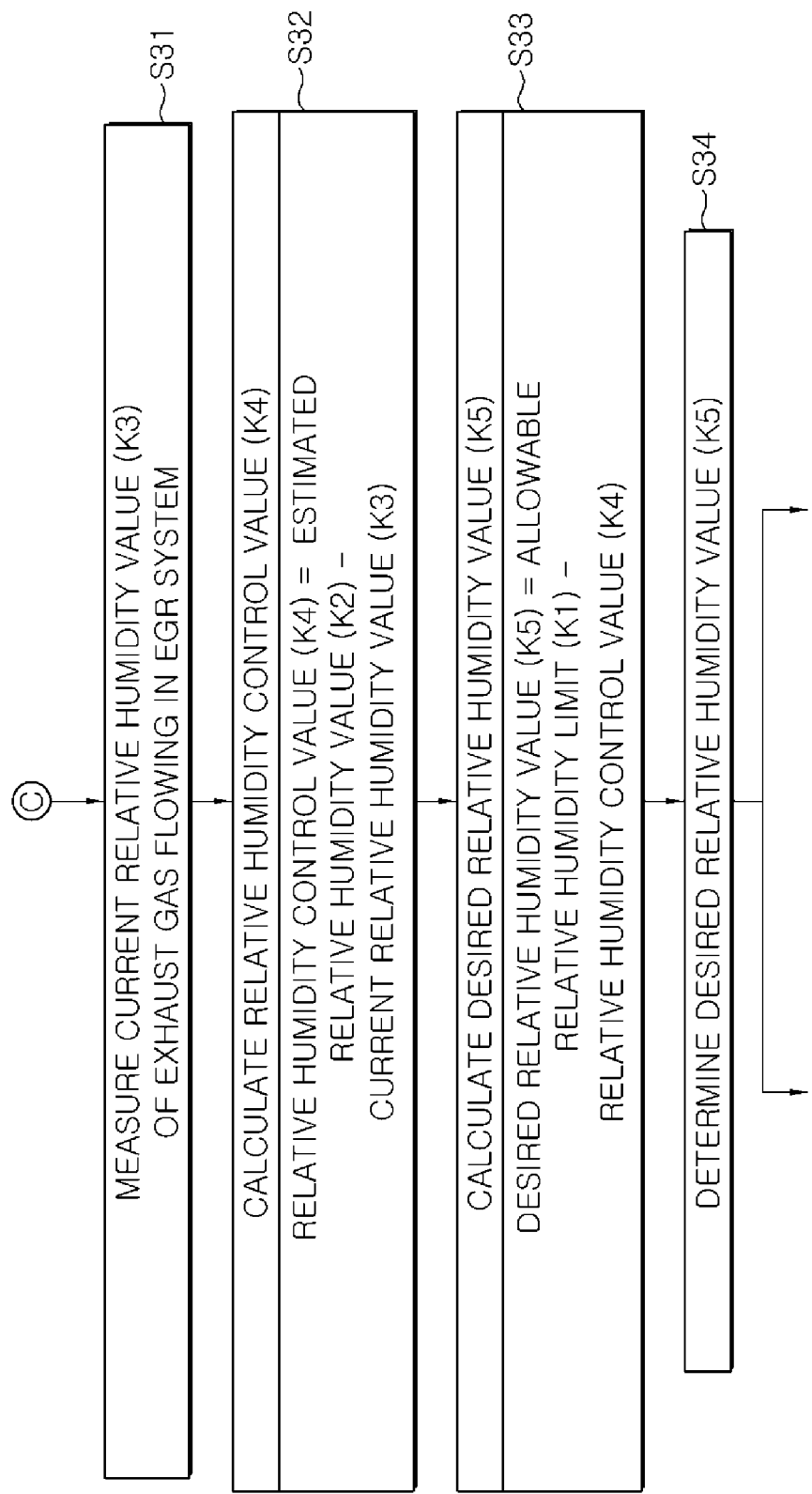

FIG. 7, including FIGS. 7(A) and 7(B), is a control flowchart for preventing condensate from being produced in an EGR system by using the extension logic that is applied to exemplary embodiments.

As shown in FIG. 7, current relative humidity value K3 is detected when engine 1 and the EGR system are in operation in step S31 and a relative humidity control value K4 that should be controlled in the EGR system is calculated in step S32 by calling estimated relative humidity value K2 that has been calculated, where relative humidity control value K4=estimated relative humidity value K2− current relative humidity value K3.

Next, a desired relative humidity value K5 that should be controlled in the EGR system to prevent condensate from being produced is calculated by using relative humidity control value K4 and calling allowable relative humidity limit K1, in step S33, where desired relative humidity value K5=allowable relative humidity limit K1− relative humidity control value K4.

When desired relative humidity value K5 is calculated, as in step S34, through the processes described above, a sign + or − is given to desired relative humidity value K5, and as a result, different control logics are selected and applied.

Step S35 shows that desired relative humidity value K5 is given the + sign and step S40 shows an EGR control logic for this case.

The EGR control logic is an intake flow rate control that is implemented by matching a base map that is set in advance in the ECU, which is a base logic that is necessary for controlling the EGR system, as described above.

When it is ascertained that the engine stops, as in step S70 in FIG. 1, after the EGR control logic is executed, all the control logics are initialized and switched into a standby mode until the engine is restarted.

On the contrary, step S36 shows when desired relative humidity value K5 is given the − sign and step S50 shows an extension logic that is executed in this case.

The extension logic is, unlike the EGR control logic, a logic performing the exhaust gas condensate control method according to exemplary embodiments and is executed by an ETK ECU that implements additional functions of the ECU, as described above.

The extension logic that is executed in exemplary embodiments is implemented by selecting some of the components of the EGR system as control objects and feedback-controlling the control objects in accordance with the degree of desired relative humidity value K5=− such that the control objects are optimized with desired relative humidity value K5.

A control compensation value Wc is required in the extension logic, as in step S51. Control compensation value Wc is calculated by applying a compensation map based on an inlet temperature change diagram and the number of revolution of the turbo charger, as in step S52.

The compensation map was constructed on the basis of data acquired from tests for the specifications of the engine and the turbo charger.

When control compensation value Wc is calculated, as described above, a compensation factor CF is generated on the basis of calculated control compensation value Wc, as in step S53.

Compensation factor CF is determined by a Ramp function. In exemplary embodiments CF=0 is given for desired relative humidity value k5 or less, CF=1 is given for above desired relative humidity value K5, and generally, compensation factor CF is given as CF=0 or CF=1.

Step S54 shows a final compensation value CFf calculated in consideration of compensation factor CF.

Figure 8B:
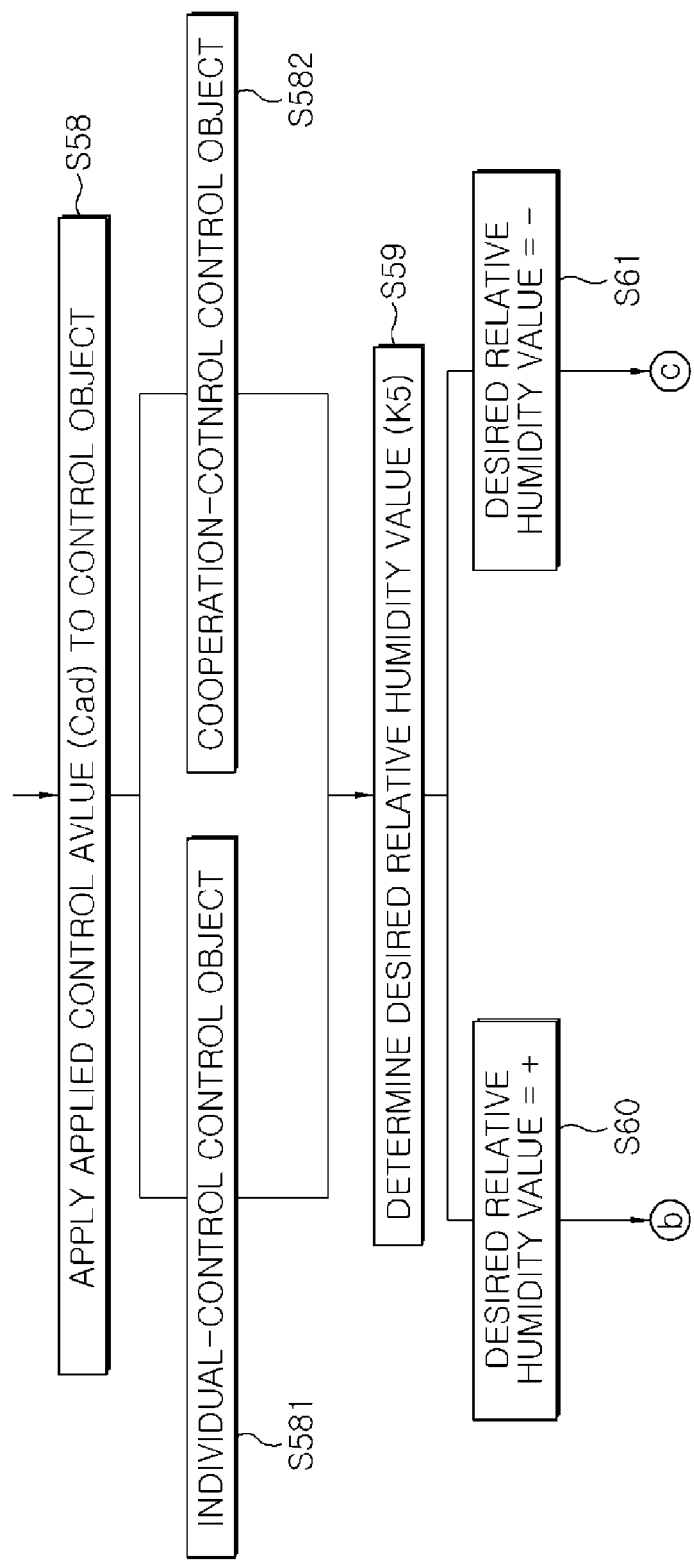

FIG. 8 shows an extension logic that is executed after final compensation value CFf is calculated.

Step S55 shows that final compensation value CFf is calculated by multiplying compensation factor CF by a corresponding value Crpm on a curve diagram for the number of revolution of an engine, which is calibrated. Final compensation value CFf allows for finally calculating an applied control value Cad by using a match relationship with the base map, as in step S56, and applied control value Cad is used as a control variable that optimizes the control object, instead of desired relative humidity value K5.

In this case, the base map denotes a map that is applied to the EGR control logic described above.

When applied control value Cad is finally calculated, as described above, a control object is selected from the components of the EGR system, as in step S57. The control object is an object that can prevent condensate from being produced by being feedback-controlled and optimized in accordance with applied control value Cad.

Step S571 shows the selected control object, which selects all of a component for control of desired amount of intake air X, a component for control of opening amount of EGR valve Y, as in step S572, and a component for control of boost pressure Z, as in step S573, as control objects.

When control objects X, Y, and Z are selected, as described above, feedback control for control objects X, Y, and Z is performed, with applied control value Cad as a control variable, as in step S58.

Step S581 is an individual control method that independently controls control objects X, Y, and Z, in which intake air flow rate Qa, passing flow rate Na, and the boost pressure are handled as individual control variables.

That is, in the individual control method, only intake air flow rate Qa that flows into mixing pipe line 8 of the EGR system is controlled, when control of desired amount of intake air X is selected, only passing flow rate Na of the exhaust gas is controlled by the opening amount of the EGR valve (LP-EGR valve or HP-EGR valve) of the EGR system when control of opening amount of EGR valve Y is selected, and only the boost pressure of the EGR system is controlled when control of boost pressure Z is selected.

On the contrary, step S582 is a cooperation control method that cooperatively controls a plurality of selected control objects X, Y, and Z in one control unit, in which all of intake air flow rate Qa, passing flow rate Na, and the boost pressure are simultaneously handled as control variables.

Accordingly, in the cooperation control method, it is possible to more accurately control the selected control objects X, Y, and Z and considerably increase control reliability, as compared with the individual control method.

When one cycle is performed for control objects X, Y, and Z through the processes described above, as in step S59, the state of desired relative humidity value K5 is changed and it is determined whether desired relative humidity value K5 is satisfied, and then the process feeds back to an appropriate control step fitting to the determined result.

For example, step S60 shows when the state is changed into desired relative humidity value K5=+, as a result of determining whether desired relative humidity value K5 is satisfied, in which the possibility of producing condensate is removed, such that the process returns to step S35 and is switched into the process of performing the EGR control logic, as in step S40 of FIG. 7.

On the contrary, step S61 shows when desired relative humidity value K5=− is maintained, as a result of determining whether desired relative humidity value K5 is satisfied, in which the possibility of producing condensate remains, such that the process returns to step S36 and is switched into the process of performing again the extension logic, as in step S50 of FIG. 7.

As described above, in both of the individual control and the cooperation control of control objects X, Y, and Z, feedback control is performed for desired relative humidity value K5, such that it is possible to preclude in real time condensate from being produced from the exhaust gas in the EGR system, for the operation section of the engine.

As described above, according to the exhaust gas condensate control method of exemplary embodiments, since condensate is precluded from being produced from the exhaust gas discharged from the engine and flowing through the pipes, when the control method is applied to the exhaust system of a vehicle, corrosion of the pipes in the exhaust system due to condensate can be prevented, and particularly, the components in the EGR line in the EGR system can be safely protected from the danger of corrosion, such that actual applicability to vehicles of the LP-EGR, which has larger advantage than the HP-EGR, can be considerably increased.

Figure 9:
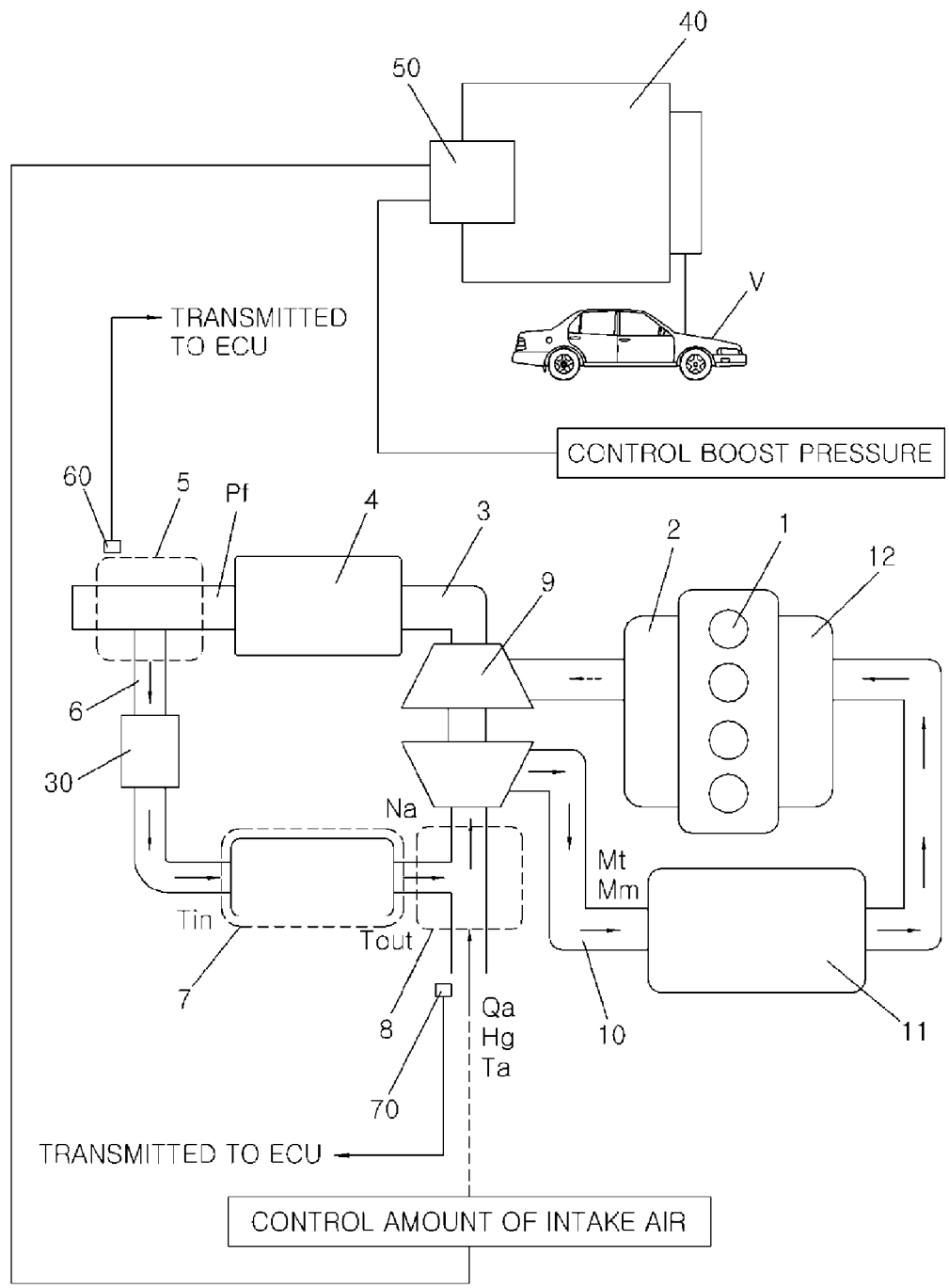
FIG. 9 is a view showing an exemplary configuration of an LP-EGR type of EGR system using an exemplary exhaust gas condensate control method of the present invention.

FIG. 9 shows an example of an LP-EGR type of EGR system using an exhaust gas condensate control method according to exemplary embodiments.

As described above, according to the LP-EGR type of EGR system, an exhaust line 3, which is connected with a turbine of a turbo charger 9 and a filter 4, is connected to an exhaust manifold 2 of an engine 1, an LP-EGR line 6 diverging from the rear end of filter 4 and having an LP-EGR valve 5 and an LP-EGR cooler 7 is connected to a mixing pipe line 8 that sucks an external air for mixing, at the front end of turbo charger 9, and an intake pipe line 10 that is connected to mixing pipe line 8 and an intercooler 11 is connected to intake manifold 12 of engine 1.

The LP-EGR type of EGR system is controlled by using ECU 40 controlling engine 1 as well as a vehicle V, and for this exemplary configuration, ECU 40 is provided with an ETK ECU 50 for the exhaust gas condensate control method according to exemplary embodiments, with the EGR control logic for general intake flow rate control.

ECU 40 receives a variety of information for checking the state of the LP-EGR type of EGR system from sensors when implementing a main logic. For example, a pressure sensor 60 disposed at LP-EGR valve 5 provides exhaust gas pressure information and a humidity sensor 70 disposed at mixing pipe line 8 connected with LP-EGR line 6 and intake pipe line 10 provides humidity information in the exhaust gas and the intake air.

Pressure sensor 60 and humidity sensor 70 are examples and various types of sensors are usually provided and provide information to ECU 40.

When the exhaust gas condensate control method is performed, ETK ECU 50 controls the opening amount of LP-EGR valve 5 selected as the control object, controls the amount of intake air flowing into mixing pipe line 8 from the outside, and controls boost pressure generated in the exhaust line, LP-EGR line 6, and intake pipe line 10, and for this exemplary configuration, a circuit is formed to communicate with the control objects through an ETK interface cable.

ETK ECU 50, as described above, is a control logic that is executed in a program called ASCET by interrupting some of the logics in ECU 40, which generally denotes a function of controlling the engine under conditions out of a main control area of ECU 40.

Further, the LP-EGR type of EGR system may include an emergency filter 30 in LP-EGR line 6 and emergency filter 30 is provided to prevent an exhaust gas flowing into the intake system of engine 1 when filter 4 is damaged.

In exemplary embodiments, the information calculated from the LP-EGR type of EGR system includes exhaust gas passing mass Na diverging from the rear end of DPF type of filter 4 to LP-EGR line 6, temperature Tin and Tout of the exhaust gas flowing out of intercooler 7 through the EGR pipe, temperature Mt and mass Mm of the gas mixture composed of an exhaust gas and an intake air, absolute humidity Ha1, relative humidity Hr1 and partial water vapor pressure Sp1 of the exhaust gas, and absolute humidity Ha2, relative humidity Hr2, partial water vapor pressure Sp2 and saturated water vapor pressure Hp2 of the gas mixture.

In the control factors, exhaust gas passing mass Na is calculated from LP-EGR valve 5, the temperature Tout, pressure Pout, absolute humidity Ha1, relative humidity Hr1, partial water vapor pressure Sp1 of the exhaust gas are calculated from LP-EGR cooler 7, temperature Mt and mass Mm of the gas mixture are calculated from mixing pipe line 8, and absolute humidity Ha2, relative humidity Hr2, partial water vapor pressure Sp2 and saturated water vapor pressure Hp2 of the gas mixture are calculated from intercooler 11, which are used for calculating estimation factor W and removal factors Va and Vb, as described above.

Estimation factor W and removal factors Va and Vb calculated from the LP-EGR type of EGR system are used to calculate estimated relative humidity value K2.

As described above, when estimated relative humidity value K2 is calculated, allowable relative humidity limit K1 calculated from the exhaust gas discharged from engine 1 and flowing in the LP-EGR type of EGR system and current relative humidity value K3 calculated from the exhaust gas flowing into EGR line 6 from LP-EGR valve 5 and passing through LP-EGR cooler 7 are calculated, and then desired relative humidity value K5 is determined by the relationship of the values and converted into the final applied control value Cad.

Applied control value Cad is used to feedback-controlling the opening amount of LP-EGR valve 5, the amount of intake air of mixing pipe line 8, and the boost pressure, in the individual control method or the cooperation control method, through ETK ECU 50 connected to ETK interface cable.

As described above, since the opening amount of LP-EGR valve 5, the amount of intake air of mixing pipe line 8, and the boost pressure, which are control objects, are optimally controlled, condensate can be precluded from being produced in the LP-EGR type of EGR system.

Therefore, turbo charger 9 and intercooler 11 that are components of the LP-EGR can be free from the possibility of corrosion due to condensate, and accordingly, actual applicability to vehicles of the LP-EGR type of EGR system having various advantages in comparison to the HP-EGR can be significantly increased.

Figure 10:
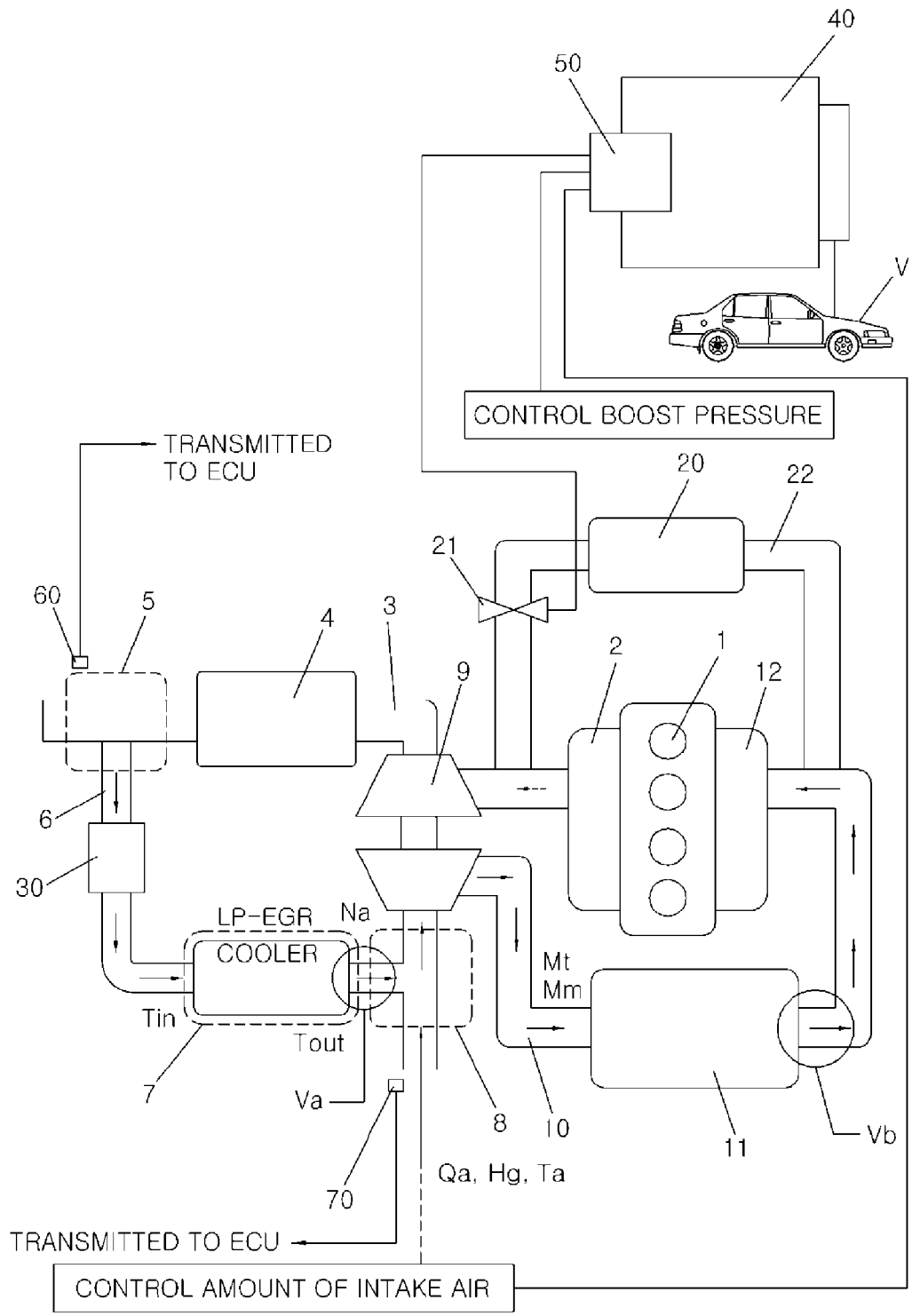
FIG. 10 is a view showing an exemplary configuration of an LP-EGR+HP-EGR type of EGR system using an exemplary exhaust gas condensate control method of the present invention.

Meanwhile, FIG. 10 is a view showing the configuration of an LP-EGR+HP-EGR type of EGR system using an exhaust gas condensate control method according to exemplary embodiments.

As shown in FIG. 10, the EGR system is further equipped with an HP-EGR in the LP-EGR type of EGR system described above with reference to FIG. 9. The HP-EGR includes an HP-EGR line 22 diverging from exhaust manifold 2 of engine 1 and connected to intake manifold 12 of engine 1, and an HP-EGR valve 21 and an HP-EGR cooler 20 in HP-EGR line 22.

ECU 40 in the LP-EGR+HP-EGR type of EGR system is also provided with a pressure sensor 60 and a humidity sensor 70, which has the same functions as those in the LP-EGR type of EGR system shown in HG. 9.

Further, similarly, in the LP-EGR+HP-EGR type of EGR system, as described above, ETK ECU 50 in ECU 40 feedback-controls the opening amount of LP-EGR valve 5, the amount of intake air of mixing pipe line 8, and the booster pressure in the individual control method or the cooperation control method, such that it is possible to preclude condensate from being produced.

Therefore, in the LP-EGR+HP-EGR type of EGR system according to exemplary embodiments, similar to the LP-EGR type of EGR system shown in FIG. 9, the components can be free from the possibility of corrosion due to condensate and the LP-EGR, having various advantages as the HP-EGR in actual applicability to vehicles, can be implemented such that it is possible to further improve the function of the EGR system.

For convenience in explanation and accurate definition in the appended claims, the terms "front" or "rear", "inside" or "outside", and etc. are used to describe features of exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the claims appended hereto and their equivalents.

What is claimed is:

1. An exhaust gas condensate control method for controlling condensation in an Exhaust Gas Recirculation (EGR) system, comprising:
a step of setting a condition that sets an allowable relative humidity limit K1 of an exhaust gas flowing in the EGR system after being discharged from an engine, and detects a current relative humidity value K3 from an operational state of the engine and the EGR system;
a step of calculating humidity factors that distributes the exhaust gas in the EGR system, selects modeling objects for calculations of an estimation factor W and removal factors Va and Vb, calculates the estimation factor W and the removal factors Va and Vb, and calculates an estimated relative humidity value K2 of the exhaust gas flowing in the EGR system;
a step of executing humidity removal that determines a desired relative humidity value K5 for the EGR system as desired relative humidity value K5 =+ or − from relationships of the allowable relative humidity limit K1, the current relative humidity value K3, and the estimated relative humidity value K2, and executes by an electronic control unit (ECU) an EGR control logic to control humidity in the EGR system with an intake flow rate control if it is determined that the desired relative humidity value K5 =+, or executes an extension logic of a feedback control if it is determined that the desired relative humidity value K5 =−; and
a step of controlling a standby mode that performs initialization to return-to the step of setting a condition when the engine stops.

2. The exhaust gas condensate control method as defined in claim 1, wherein the allowable relative humidity limit K1 that is set in the step of setting a condition is set on the basis of a measured degree of water content in the exhaust gas flowing to an EGR line of the EGR system as well as a gas mixture composed of the exhaust gas flowing in the EGR system after being discharged from the engine and an intake air sucked from outside.

3. The exhaust gas condensate control method as defined in claim 2, wherein the allowable relative humidity limit K1 is set in consideration of a number of revolution and a fuel load of the engine and subdivided into a plurality of allowable relative humidity limits in accordance with of the engine and the EGR system.

4. The exhaust gas condensate control method as defined in claim 1, wherein the step of calculating the humidity factors performed by:
a step of estimating humidity that
selects, as a modeling object for the estimation factor W, an inflow section that distributes the exhaust gas from a rear end of a filter disposed in an exhaust line in the EGR system, a flow section that keeps the flow of the exhaust gas, and a mixing section where a gas mixture composed of the exhaust gas and an intake air drawn from outside is produced,
acquires mass values, temperature values, and pressure values of the exhaust gas and the gas mixture from the modeling object, and
calculates the estimation factor W on the basis of the acquired mass values, temperature values, and pressure values of the exhaust gas and the gas mixture from the modeling object; and
a step of removing humidity that
selects, as another modeling object for the removal factors Va and Vb, a flow section that keeps the flow of the exhaust gas distributed from the rear end of the filter in the EGR system and a continuous flow section that allows the gas mixture to flow to an intake manifold of the engine,
acquires humidity values and water vapor values for the exhaust gas and the gas mixture from said another modeling object,
calculates the removal factors Va and Vb on the basis of the acquired humidity values and water vapor values for the exhaust gas and the gas mixture from said another modeling object, and calculates the estimated relative humidity value K2 of the exhaust gas flowing in the EGR system on the basis of the estimation factor W and the removal factors Va and Vb.

5. The exhaust gas condensate control method as defined in claim 4, wherein conditions of ideal gas and isentropic and adiabatic reversible process are applied to the inflow section, conditions of constant pressure, convection heat transfer, and generation of fuel water vapor due to complete combustion are applied to the flow section, conditions of uniform thermodynamic state, prevention of wall heat transfer and mass transfer, ideal gas, and constant energy are applied to the mixing section, conditions of constant relative humidity of the intake air drawn from outside (regardless of temperature and pressure) and generation of fuel water vapor due to complete combustion are applied to the continuous flow section, and the estimation factor and the removal factors are deduced with the conditions applied.

6. The exhaust gas condensate control method as defined in claim 5, wherein the estimation factor W is a function of an exhaust gas passing mass Na diverting and flowing to the EGR line, a temperature Tout and a pressure Pout of the exhaust gas flowing through the EGR line, and a gas mixture temperature Mt and a gas mixture mass Mm of the gas mixture composed of the exhaust gas passing mass Na and the intake air drawn from outside and flowing into the intake manifold; and the removal factor Va is a function of an absolute humidity Ha1, a relative humidity Hr1, and a partial water vapor pressure Sp1 of the exhaust gas flowing through the EGR line, and the removal factor Vb is a function of an absolute humidity Ha2 and relative humidity Hr2 of the gas mixture composed of the intake air drawn from outside and the exhaust gas, a partial water vapor pressure Sp2, and a saturated water vapor pressure Hp2.

7. The exhaust gas condensate control method as defined in claim 6, wherein the exhaust gas passing mass Na is a value acquired by multiplying a theoretical passing flow rate by a compensation factor where the compensating factor is calculated by applying an effective flow area of a nozzle in an entire flow area of the nozzle in consideration of inlet and outlet pressures of a low pressure (LP) EGR valve.

8. The exhaust gas condensate control method as defined in claim 1, wherein the EGR control logic that is executed in the step of executing humidity removal controls the EGR system using an intake flow rate control by matching a predetermined map, and the extension logic feedback-controls control objects in the modeling objects until the desired relative humidity value is satisfied and switched to K5 =+.

9. The exhaust gas condensate control method as defined in claim 8, wherein the desired relative humidity value K5 is calculated by subtracting a relative humidity control value K4 from the allowable relative humidity limit K1, where the relative humidity control value K4 is a value acquired by subtracting the current relative humidity value K3 from the estimated relative humidity value K2; and the desired relative humidity value is assigned as K5 =+ or − to indicate the possibility of condensation.

10. The exhaust gas condensate control method as defined in claim 8, further comprising a step in the extension logic that
calculates a control compensation value Wc by applying a compensation map based on an inlet temperature change diagram and a number of revolution of a turbo charger, where the compensation map is constructed on the basis of data acquired from tests according to specifications of the engine and the turbo charger;

determines a compensation factor CF between 0 and 1 on the basis of the calculated control compensation value Wc;

calculates a final compensation value CFf by multiplying the compensation factor CF by a corresponding value Crpm calibrated on a curve diagram according to a number of revolution of the engine; and calculates an applied control value Cad by using a match relationship with the base map, and substitutes the control value Cad for the desired relative humidity value K5 as a control variable to optimize the control objects.

11. The exhaust gas condensate control method as defined in claim 10, wherein the compensation factor CF is determined by using a Ramp function, the compensation factor CF =0 is for the desired relative humidity value K5 or less, and the compensation factor CF=1 is for above the desired relative humidity value K5.

12. The exhaust gas condensate control method as defined in claim 8, wherein the control objects in the modeling object of the extension logic are a component that distributes the exhaust gas from the exhaust line, a component that sucks the intake air from outside to be mixed with the exhaust gas into the gas mixture, and a component that generates a boost pressure, and the components are controlled by an individual control method such that each of the components is controlled individually, or by a cooperation control method such that the components are controlled cooperatively by one control unit.

13. An exhaust gas recirculation system where an exhaust gas condensate control method is applied, the system comprising:

an LP-EGR line that is connected with a turbine of a turbo charger, diverges from an exhaust line connected to an exhaust manifold of an engine, and allows an exhaust gas to flow;

a mixing pipe line that is connected with the LP-EGR line at an front end of the turbo charger, mixes an intake air drawn inside from outside with the exhaust gas flowing out of the LP-EGR line to form a gas mixture, and sends the gas mixture to the turbo charger;

an intake pipe line connected the mixing pipe line to an intake manifold of the engine; and an electronic control unit (ECU) including an EGR base control logic that controls an LP-EGR valve and an LP-EGR cooler in the LP-EGR line and an intercooler in the intake pipe line using an intake air flow rate control by matching a base map, and an EGR advanced control logic that controls the LP-EGR valve and the LP-EGR cooler in the LP-EGR line and the intercooler in the intake pipe line to remove condensate in the EGR system;

wherein an allowable relative humidity limit K1 required for the EGR advanced control logic is calculated from the gas mixture composed of the exhaust gas flowing in the EGR system and the intake air sucked from outside;

an estimated relative humidity value K2 is calculated from calculated or measured factors, including exhaust gas passing mass Na of the LP-EGR valve, temperature Tout, pressure Pout, absolute humidity Ha1, relative humidity Hr1, and partial water vapor pressure Sp1 of the LP-EGR cooler, temperature Mt and mass Mm of the gas mixture in the mixing pipe line, and absolute humidity Ha2, relative humidity Hr2, partial water vapor pressure Sp2, and saturated water vapor pressure Hp2 of the intercooler;

a current relative humidity value K3 is calculated from the exhaust gas flowing into the EGR line from the LP-EGR valve and passing through the LP-EGR cooler; and the control objects of the EGR advanced control logic are the mixing pipe line in which an amount of the intake air to be drawn is controlled, the LP-EGR valve in which an flow rate of the exhaust gas distributed to the LP-EGR line is controlled by controlling an opening amount of the valve, and a boost pressure that is changed by operations of the engine and the EGR system.

14. The exhaust gas recirculation system as defined in claim 13, wherein the control objects are controlled by an individual control method such that each of the components are controlled individually, or by a cooperation control method such that the components are controlled cooperatively by one control unit.

15. The exhaust gas recirculation system as defined in claim 13, wherein the ECU further includes an embedded toolkit electronic control unit (ETK ECU) performing the EGR base control logic and the EGR advanced control logic, and the ETK ECU is connected to an ETK interface cable to control the opening amount of the LP-EGR valve, the intake air flow rate in the mixing pipe line, and the boost pressure.

16. The exhaust gas recirculation system as defined in claim 13, further comprising an emergency filter to prevent an exhaust gas flowing into an intake system of the engine.

17. The exhaust gas recirculation system as defined in claim 13, further comprising a pressure sensor to detect a pressure of the exhaust gas and a humidity sensor to detect a humidity of the exhaust gas and the intake air.

18. The exhaust gas recirculation system as defined in claim 13, further comprising:

a high-pressure (HP) EGR line diverging from the exhaust manifold and connected to the intake manifold; and an HP-EGR valve and an HP-EGR cooler disposed in the HP-EGR line to allow the exhaust gas to flow from the exhaust manifold to the intake manifold.

* * * * *